(12) United States Patent
Garnet

(10) Patent No.: US 9,139,254 B2
(45) Date of Patent: Sep. 22, 2015

(54) UNIVERSAL LOW-FRICTION BICYCLE HUB TRANSMISSION

(71) Applicant: Jeremy M. Garnet, Pointe-Claire (CA)

(72) Inventor: Jeremy M. Garnet, Pointe-Claire (CA)

(*) Notice: Subject to any disclaimer, the term of this patent is extended or adjusted under 35 U.S.C. 154(b) by 82 days.

(21) Appl. No.: 14/181,701

(22) Filed: Feb. 16, 2014

(65) Prior Publication Data

US 2014/0302963 A1    Oct. 9, 2014

(30) Foreign Application Priority Data

Apr. 4, 2013   (CA) ...................................... 2812588

(51) Int. Cl.
| | |
|---|---|
| *B62M 11/10* | (2006.01) |
| *B62M 11/14* | (2006.01) |
| *B62M 11/16* | (2006.01) |
| *B62M 13/00* | (2010.01) |
| *B62M 13/02* | (2006.01) |
| *B62M 13/04* | (2006.01) |

(52) U.S. Cl.
CPC ............... *B62M 11/14* (2013.01); *B62M 11/10* (2013.01); *B62M 11/16* (2013.01); *B62M 13/00* (2013.01); *B62M 13/02* (2013.01); *B62M 13/04* (2013.01)

(58) Field of Classification Search
CPC ...... B62M 11/10; B62M 11/14; B62M 11/16; B62M 13/00; B62M 13/02; B62M 13/04
See application file for complete search history.

(56) References Cited

U.S. PATENT DOCUMENTS

| | | | |
|---|---|---|---|
| 277,802 A | 5/1883 | Stanley et al. | |
| 294,641 A | 3/1884 | Latta | |
| 486,055 A | 11/1892 | Saladee | |
| 510,606 A | 12/1893 | Lipe et al. | |
| 1,914,797 A | 6/1933 | Baker | |
| 4,735,430 A | 4/1988 | Tomkinson | |
| 5,005,438 A | 4/1991 | Marshall | |
| 5,454,766 A * | 10/1995 | Mills | 475/170 |
| 6,348,021 B1 * | 2/2002 | Lemanski | 475/164 |
| 7,993,234 B2 | 8/2011 | Kim | |
| 2004/0209726 A1 | 10/2004 | Hwang | |
| 2011/0275475 A1 * | 11/2011 | Eisenbeil | 475/296 |

FOREIGN PATENT DOCUMENTS

| | | |
|---|---|---|
| CN | 2257788 Y | 7/1997 |
| DE | 20315691 U1 | 2/2004 |
| GB | 2161887 A | 1/1986 |
| JP | 2005324603 A | 11/2005 |
| KR | 100217891 B1 | 9/1999 |
| WO | 2007132999 A1 | 11/2007 |

* cited by examiner

*Primary Examiner* — Tisha Lewis

(57) ABSTRACT

Compared to derailleur bicycle chain transmissions, internal hub transmissions for bicycles have higher friction and a lower torque capacity. In addition, bicycle hub transmissions are generally incompatible with alternate drive arrangements such as direct-drive, or different mounting options such as mono-blade mounting. The present invention addresses these concerns by employing bevel gears with roller teeth in a planetary bicycle hub transmission. The bevel gear configuration allows larger planet gears, which gives sufficient circumferential space for roller teeth to reduce the meshing friction. The larger planet gears also increase the allowable torque. Furthermore, the bevel gear configuration facilitates the high ratios required for direct-drive, and results a hub structure highly compatible with mono-blade mounting. With this is view, the hub is designed for both chain-drive and direct-drive, and for both double-blade and mono-blade mounting.

10 Claims, 22 Drawing Sheets

UNIVERSAL LOW-FRICTION BICYCLE HUB TRANSMISSION

FIELD OF THE INVENTION

The invention relates to the field of bicycle transmissions, specifically bicycle hub transmissions, also known as internal gear hubs.

BACKGROUND OF THE INVENTION

Bicycle internal gear hubs are well-known and have been in production for over a century. Most of these hubs operate by means of a planetary gear train, composed of three elements: a central sun gear; a planet gear holder which positions several planet gears around the sun gear; and a ring gear externally surrounding these planet gears. Many gear ratios are available by simply preventing the rotation of one of these elements, and choosing the remaining two elements as either the input or output of the transmission.

Compared to the popular derailleur chain transmission, a bicycle planetary hub is more compact, less vulnerable to damage, and less maintenance intensive. Furthermore, it allows gear changes when the bicycle is stopped. However, there are several significant disadvantages to internal hub transmissions.

Firstly, the internal friction of a hub gear is considerably greater than that of a derailleur system. This is due to the meshing of many small gears, all in a compact assembly, causing considerable friction. Since transmission efficiency is generally lower at lower pedal forces (Wilson 2004), internal friction is of greater importance when a bicycle is ridden at moderate speed. Hub-geared bikes are commonly purchased for their in-town practicality, and therefore pedalled at moderate urban speeds. Therefore the higher internal friction of hub gears is a significant disadvantage for their intended market.

Secondly, hub gears cannot withstand as much torque as derailleur gears because the gear teeth are considerably smaller that the sprocket teeth of a derailleur system. This torque limitation can prevent hub gears from being used in tandem bicycles, where the applied torque is higher. In general, gears are better adapted to high speeds and low torques, and chains to low speeds and high torques. Since a bicycle is a low speed, high-torque machine, it is not surprising that chain transmissions, such as the derailleur, dominate the bicycle market.

Thirdly, it is not practical to convert current bicycle gear hubs to other drive configurations. For example, current hubs are designed for chain-drive and are incompatible with direct-drive. With direct-drive, the pedals drive the hub directly with no intermediate chain or shaft drive. Direct-drive, particularly in the front-wheel-drive recumbent format (FIG. 1), has distinct advantages. It gives a very simple bicycle with no chain, a 50/50 weight distribution, and good braking stability (Garnet 2009). Current hubs are incompatible with direct-drive for several reasons: a) the axle is not strong enough for direct pedal load torsion; b) the gear ratios are too low; c) the gear tooth strength is insufficient for the applied loads; and d) the configuration of the hub is incorrect for proper crank mounting. If a hub could be made with internal gearing adaptable to both chain-drive and direct-drive, the larger available market would make direct-drive bicycles cheaper and thus more cost effective. There are advantages for chain-drive bicycles also: since a 1:1 ratio chain-drive is needed, a smaller front sprocket could be used, giving a more compact chain loop (FIG. 2), and allowing a smaller and lighter chain case.

Fourthly, currently available hubs transmissions are generally incompatible with mono-blade mounting. The term "mono-blade mounting" means that the wheel is mounted on one side only and the front fork or rear stay therefore has only a single blade (FIG. 3). Mono-blade forks and stays have several advantages over the standard double-bladed forks and stays. With mono-blade mounting, the tire can be changed without removing the wheel. Mono-blades can also improve the aerodynamics of the bicycle, and simplify the design of the frame (Burrows 2000). The design of folding bikes is also simplified, giving a more compact fold. Mono-blade mounting can also be used with direct-drive (FIG. 4). Currently available hubs are incompatible with mono-blade mounting because there is insufficient rigidity in the axle for one-sided installation. A hub that is compatible with both mono-blade and conventional double-blade mounting would offer more options for the bicycle frame designer, and reduce the cost compared to specially built mono-blade hubs.

These deficiencies of current bicycle transmission hubs point to a need for a hub having reduced internal friction and increased torque capacity, and also to a need for a hub that is adaptable to emerging new bicycle designs.

With these needs in view, it is an object of the present invention to provide a bicycle hub transmission with reduced internal friction. It is a further object of the invention to increase the allowable torque which can be applied to the hub. Another object of the invention to provide a bicycle hub transmission that is readily adaptable between chain-drive and direct-drive. And finally, it is an object of the invention to provide a bicycle hub transmission that is readily adaptable between conventional and mono-blade mounting.

SUMMARY OF THE INVENTION

The present invention achieves these objectives by combining bevel planetary gears with roller teeth. More specifically, the invention is a planetary bicycle hub transmission, having multiple speeds, and employing bevel gears and roller teeth. Multiple bevel planet gears are arranged on a single planet holder, engaging associated ring gears, and thus allowing multiple speeds.

The bevel gear arrangement allows much larger planet gears than conventional in-plane planet gears. Comparing the in-plane planetary transmission of FIG. 5A to a bevel planetary transmission of equivalent ratio (FIG. 5B), it can be seen immediately that the bevel planet gears (20) can be made considerably larger than the in-plane planet gears (30). FIGS. 5D depicts an alternative bevel gear design, where perpendicular bevel planet gears (40, 42) are stacked to give the same ratio as the in-line planetary gear train of FIG. 5C. As with FIG. 5B, larger planet gears result. These larger planet gears permit a larger tooth pitch resulting in a greater torque capacity for the transmission.

The larger tooth pitch gives enough space for roller gear teeth to be installed, without an excessive reduction the number of teeth in the planet gear. Although it is possible to have very few rollers in a roller tooth gear, this results in excessive rolling action, reducing the efficiency gained by the rollers. But the larger planet gears give enough space for a large number of roller teeth, allowing the low-friction benefit of the rollers to be fully realized. The arrangement can also be reversed, with the roller teeth on the ring gears and sprocket teeth on the planet gears. Essentially, the roller teeth mimic the operation of roller chain, with a resulting reduction in gear meshing friction.

The use of bevel planet gears allows the hub transmission to achieve higher gear ratios than conventional hubs. The higher ratios are particularly well suited to direct-drive, which has no chain-drive to give an intermediate step-up ratio. Critically, a step-up ratio of 1:2 is available in a single planetary unit with the use of bevel gears. This is impossible in a conventional planetary unit since it would require infinitely small planet gears. Also, with bevel gears, a large range of ratios is available without interchanging the driving and driven elements, simplifying the gear shift mechanism.

The bevel gear configuration axially separates the driven and driving elements within the hub, and places all the stationary ring gears on one side of the hub. This facilitates mono-blade mounting, since the stationary side of the hub is large and provides a readily available rigid mounting surface. The arrangement also locates the gear changing clutches all on the stationary side, ensuring that the actuating cables of these clutches are on the same side as the mono-blade. This helps to protect the gear change cables from damage and allows the tire to be changed without removing the cables.

Bicycle hub transmissions with bevel gears in a planetary format are already known in the art. As early as 1893, U.S. Pat. No. 510,606 to Lipe at al discloses a planetary bicycle hub transmission employing bevel planet gears. The driven element is the planet gear holder.

More recently, US patent application 2011/0275475 A1 to Eisenbeil discloses a multi-speed, multi-stage, planetary bicycle hub having crown gears. Crown gears are a special case of bevel gears where the teeth are oriented at a right angle to the plane of the gear wheel. Chinese patent CN 2257788Y depicts a direct-drive bicycle transmission that is planetary and employs bevel gears.

The use of roller teeth in a bicycle transmission also dates back to the late nineteenth century. U.S. Pat. No. 486,055 to Saladee (1892) depicts a bicycle transmission having a ring gear with roller teeth which drives a pinion, similarly fitted with roller teeth. The pinion then drives the bicycle wheel giving a step-up ratio. The roller teeth are fitted to reduce friction. Although the pinion is mounted within the ring gear, the transmission is not strictly planetary in form since the input and output axes are not concentric, but offset. UK patent application 2 161 887 A to Simpson discloses roller teeth in a planetary transmission, but the transmission is not specifically for a bicycle hub.

Bevel gears with roller teeth are also well known. U.S. Pat. No. 277,802 to Stanley et al (1883) discloses a bevel gear with roller teeth. PCT application WO 2007/132999 A1 presents crown gears with roller teeth in a shaft-drive bicycle. U.S. Pat. No. 7,993,234 B2 to Kim discloses a transmission mounted within a bottom bracket housing of a bicycle consisting of a planetary crown gear transmission having roller teeth. Within the same bottom bracket housing, the transmission drives an adjacent pinion with roller teeth which, in turn drives a shaft to the rear wheel through crown gearing.

It is clear from the above review that bevel planetary gears with roller teeth are known in the art of bicycle transmissions, at least in the specialized crown gear form. However, the prior art does not disclose or suggest the further step of locating such a transmission within the hub itself, in order to achieve the benefits of the present invention.

It is also evident that planetary hub transmissions with bevel gears are known in the bicycle art. However, the prior art does not teach of suggest the additional step of adding roller teeth to this hub, in order to achieve the benefits of the present invention.

DETAILED DESCRIPTION OF THE INVENTION

Figure 1:
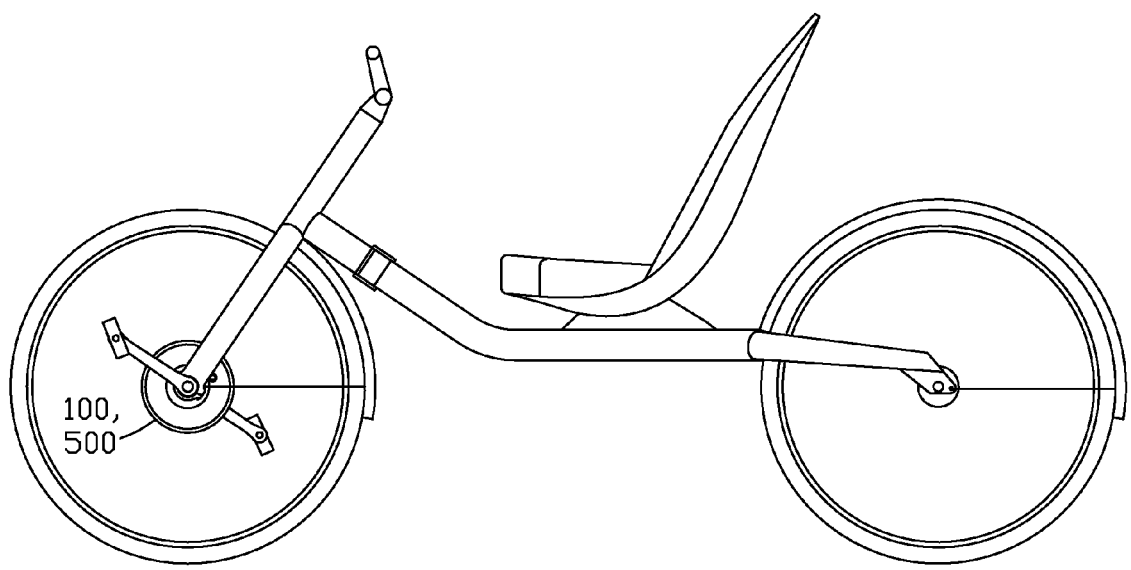
FIG. 1 is a left side view of the hub according to the invention installed in the front wheel of a direct-drive recumbent bicycle.
Figure 2:
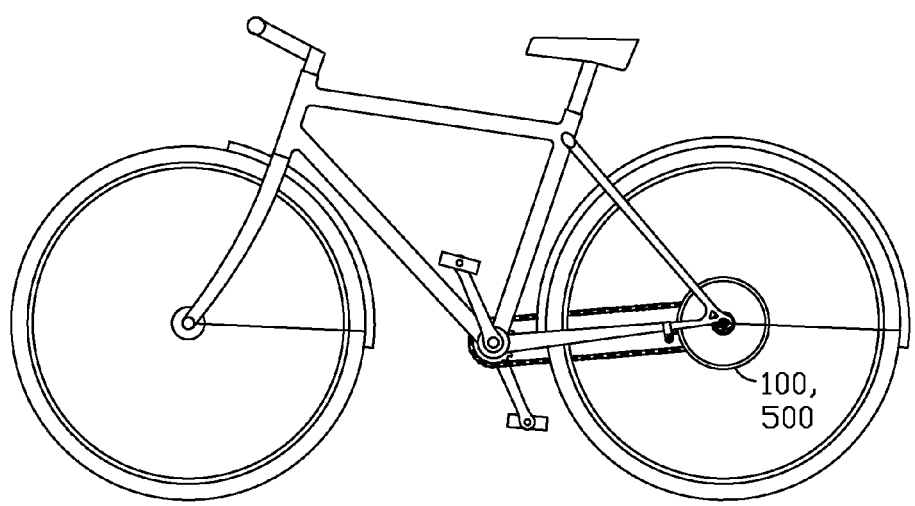
FIG. 2 is a left side view of the hub according to the invention installed in the rear wheel of a chain-drive bicycle
Figure 3:
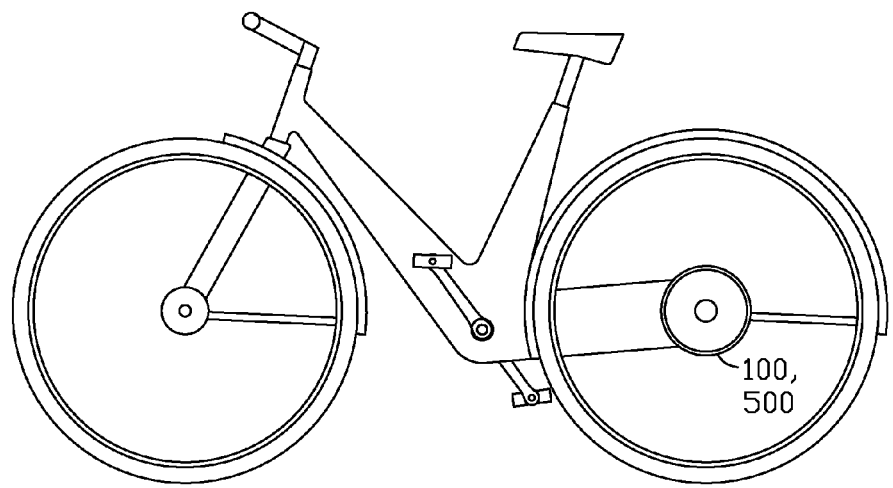
FIG. 3 is a left side view of the hub according to the invention installed in the rear wheel of a mono-blade chain-drive bicycle.

Referring to FIGS. 6 to 10, an exemplary embodiment (100) of the bicycle hub of the invention consists of a driven hollow shaft (110) which is directly connected to a planet gear holder (120). Three groups (130, 132, 134—FIG. 9) of three bevel planet gears (140, 142, 144—FIG. 7) are equally spaced on the planet gear holder (120) so as to rotate about axes (150, 152, 154) extending radially outward from the hollow shaft (110). Each of the individual bevel planet gears (140, 142, 144) of each group (130, 132, 134) are connected so as to rotate together. The plurality of connected bevel planet gears therefore rotate in a plane that is perpendicular to the plane of the planet gear holder (120).

Figure 10:
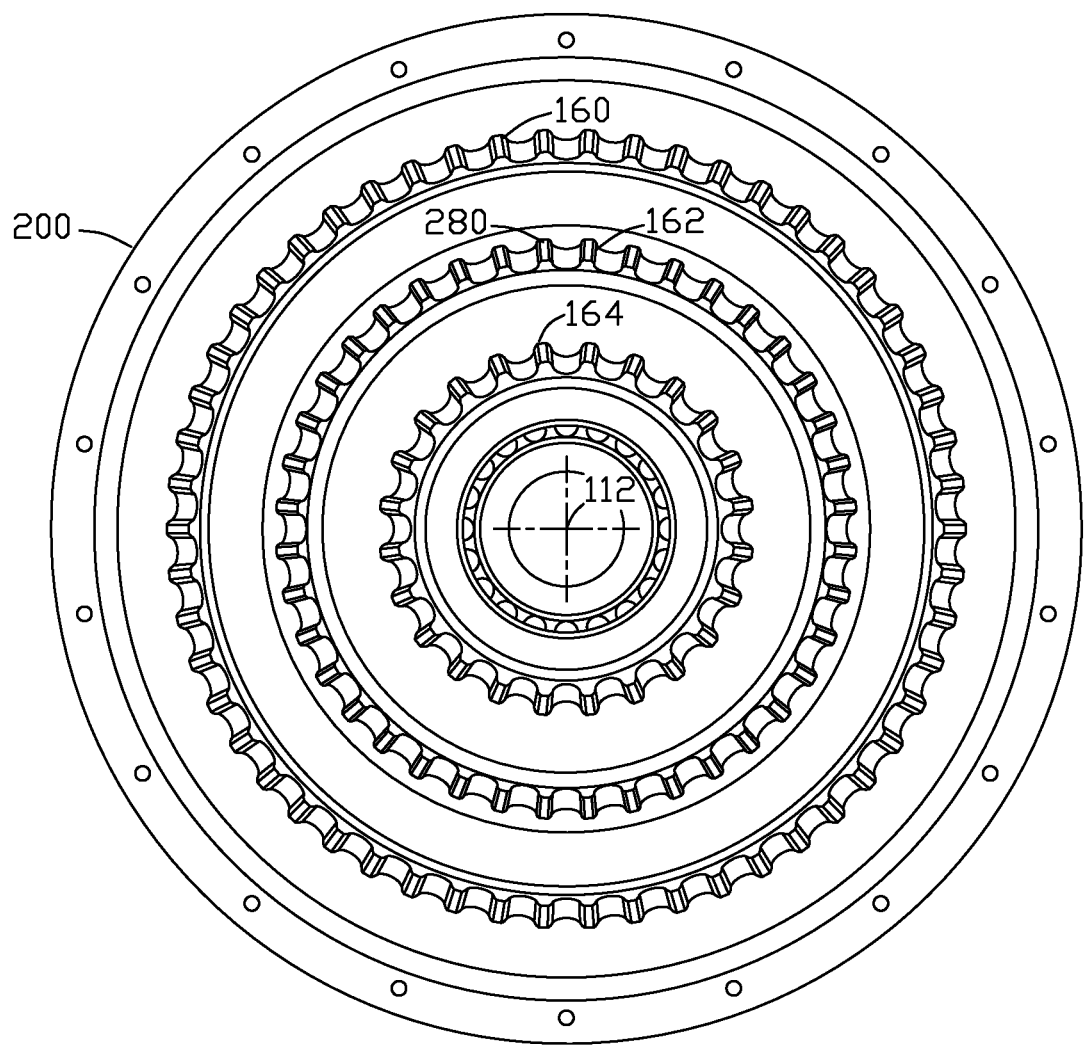
FIG. 10 is a view of the bevel ring gears installed in the bevel ring holder.

On one side (the right side in FIGS. 6 and 7) of the exemplary hub (100), the three bevel planet gears (140, 142, 144) of each group mesh with three bevel ring gears (160, 162, 164—FIG. 7), respectively. The three bevel ring gears (160, 162, 164) are mounted on a bevel ring gear holder (170). The bevel ring gear holder (170) is a held stationary by being fixed to the bicycle frame or fork. The three bevel ring gears (160, 162, 164) therefore each rotate about an axis (112) of the hollow shaft (110) in a plane parallel to the plane of rotation of the planet holder (120) (FIG. 10). Each of the bevel ring gears (160, 162, 164) can alternatively be prevented from rotation by indexed movement of a gear shift slider (186).

On the opposite side (the left side in FIGS. 6 and 7) of the exemplary hub (100), the inner bevel planet gear (144) of each group (130, 132, 134) meshes with an output bevel gear (190). The output bevel gear (190) rotates about the axis (112) of the hollow shaft (110) in a plane parallel the plane of the planet gear holder. The output bevel gear (190) drives a hub shell (200) through a first freewheel (210). There is also a second freewheel (212) between the hollow shaft (110) and the hub shell (200) which allows the hollow shaft (110) to drive the hub shell (200) directly.

Figure 11A:
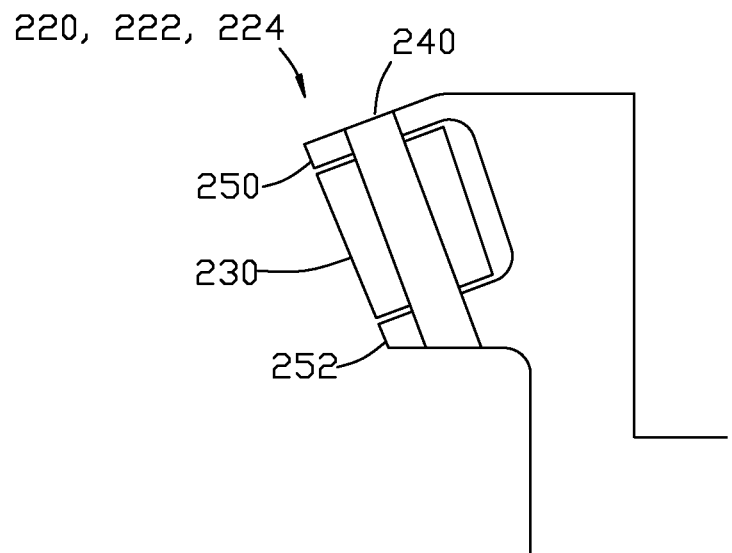
FIG. 11A is a detail drawing of a bevel gear roller tooth.
Figure 11B:
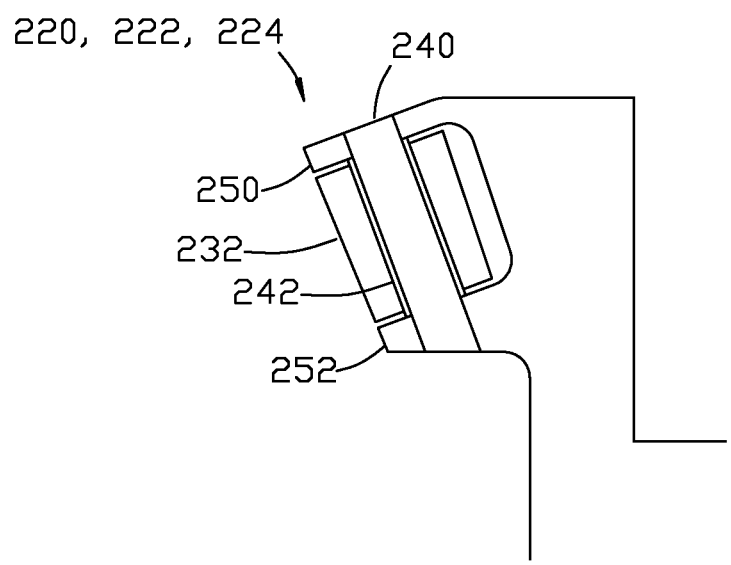
FIG. 11B is a detail drawing of the alternative bevel gear roller tooth.

All of the bevel planet gears (140, 142, 144) are equipped with roller teeth (220, 222, 224). As shown in greater detail in FIG. 11A, each roller tooth (220, 222, 224) comprises a roller element (230), a roller pin (240) and supporting flanges (250, 252). The exterior surface of the roller element (230) is essentially frustoconical in shape, with a projected imaginary apex coinciding with the axis (112). The mounting angle of each roller element (230) conforms to the required bevel angle of the respective bevel planet gear (140, 142, 144). The roller element (230) further includes a cylindrical bore. Each end of each roller pin (240) is press-fitted into bores in the supporting flanges (250, 252). The roller pins (240) pass through the cylindrical bore of the roller element (230), yielding rotational movement of each roller element (230) around each roller pin (240). Teeth (280) of each respective bevel gear ring (160, 162, 164) and the output bevel gear (190) mesh with respective roller elements (230) of the bevel planet gears (140, 142, 144). FIG. 11B depicts an alternative roller tooth mounting, where an anti-friction bushing (242) is inserted between a roller element (232) and the pin (240).

The hub transmission works as follows. For the lowest gear (1:1), all the bevel ring gears (160, 162, 164) are disengaged, and the hollow shaft (110) drives the hub shell (200) directly through the second freewheel (212). For second gear, the smallest bevel ring gear (164) is prevented from rotation with the other bevel ring gears (160, 162) free to rotate. Since the hollow shaft (110) is rotated and the bevel planet holder (120) rotates with it, this forces all the bevel planet gear sets (130, 132, 134) to rotate around respective axes (150, 152, 154) and transfer the motion to the output bevel gear (190). The output bevel gear (190) drives the hub shell (200) through the first freewheel (210) while the second freewheel (212) overruns. The second freewheel (212) overruns because the hub shell (200) is now rotating faster than the hollow shaft (110). Third gear is obtained by stopping the next larger bevel ring gear (162), and fourth gear is obtained by stopping the largest bevel ring gear (160). As with the second gear, the other bevel ring gears are free to rotate and drive is transferred through the first freewheel (210) to the hub shell (200), with the second freewheel (212) overrunning The ratios obtained follow the equation:

$$R = \left(1 + \frac{D_R}{D_O}\right) \quad (1)$$

Where,
R is the ratio
$D_R$ is the pitch diameter of the bevel ring gear that is prevented from rotation
$D_O$ is the pitch diameter of output bevel gear The construction and operation of the gear shifting mechanism is shown in detail in FIGS. 12 to 15. The gear shift slider (186) is fitted with three clutch pawls (290, 292, 294) which selectively engage protrusions (300, 302, 304) on the reverse side of the bevel ring gears (160, 162, 164), respectively.

Figure 12:
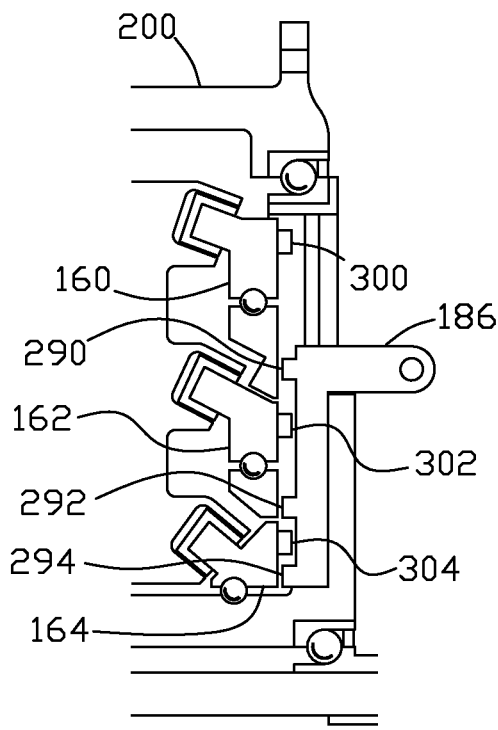
FIGS. 12-15 show the gear shifter position for each of the four gears, respectively, of the first embodiment.

FIG. 12 depicts the first gear position. The gear shift slider (186) is at the lowest position. None of the clutch pawls engage with any of the protrusions.

Figure 13:
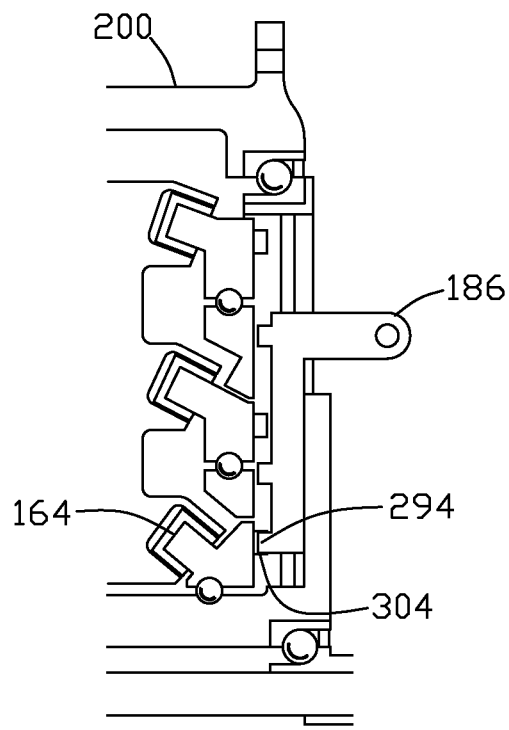

FIG. 13 shows the second gear position. The lower clutch pawl (294) engages one of the protrusions (304) of the lower bevel ring gear (164), holding it stationary.

Figure 14:
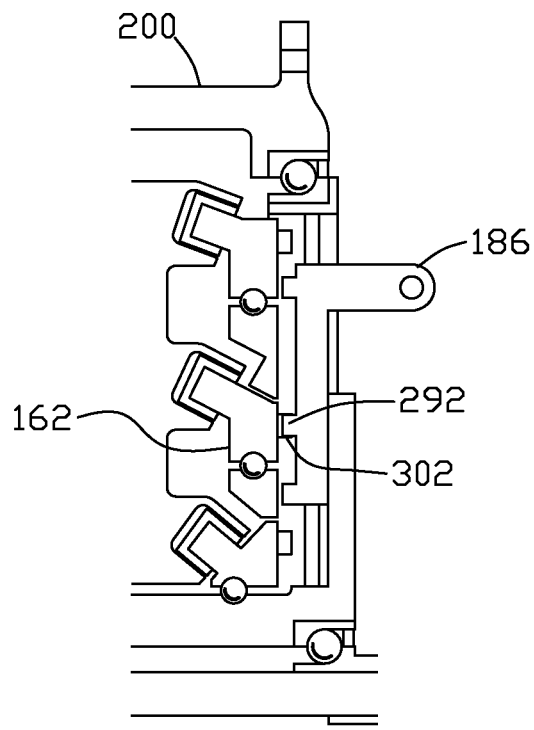

FIG. 14 illustrates the third gear position. The middle clutch pawl (292) now engages a protrusion (302) of the middle bevel ring gear (162), preventing it from turning.

Figure 15:
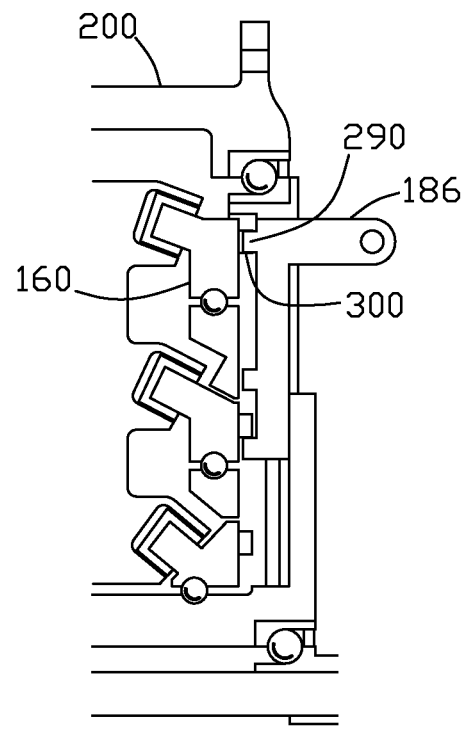

Similarly, as illustrated in FIG. 15, a fourth gear is obtained when the upper bevel ring gear (160) is prevented from rotating by engaging clutch pawl (290) with one of the protrusions (300).

The spacing of the clutch pawls (290, 292, 294) ensures that no more than one bevel ring gear is held stationary at any given position of the gear shift slider (186). This spacing is also configured to minimize the distance between successive gear engagements, so that an indexing movement of a gear shift lever can easily prevent any intermediate disengagement.

FIGS. 16 to 27 illustrate the four different drive and mounting combinations available for the hub.

Figure 16:
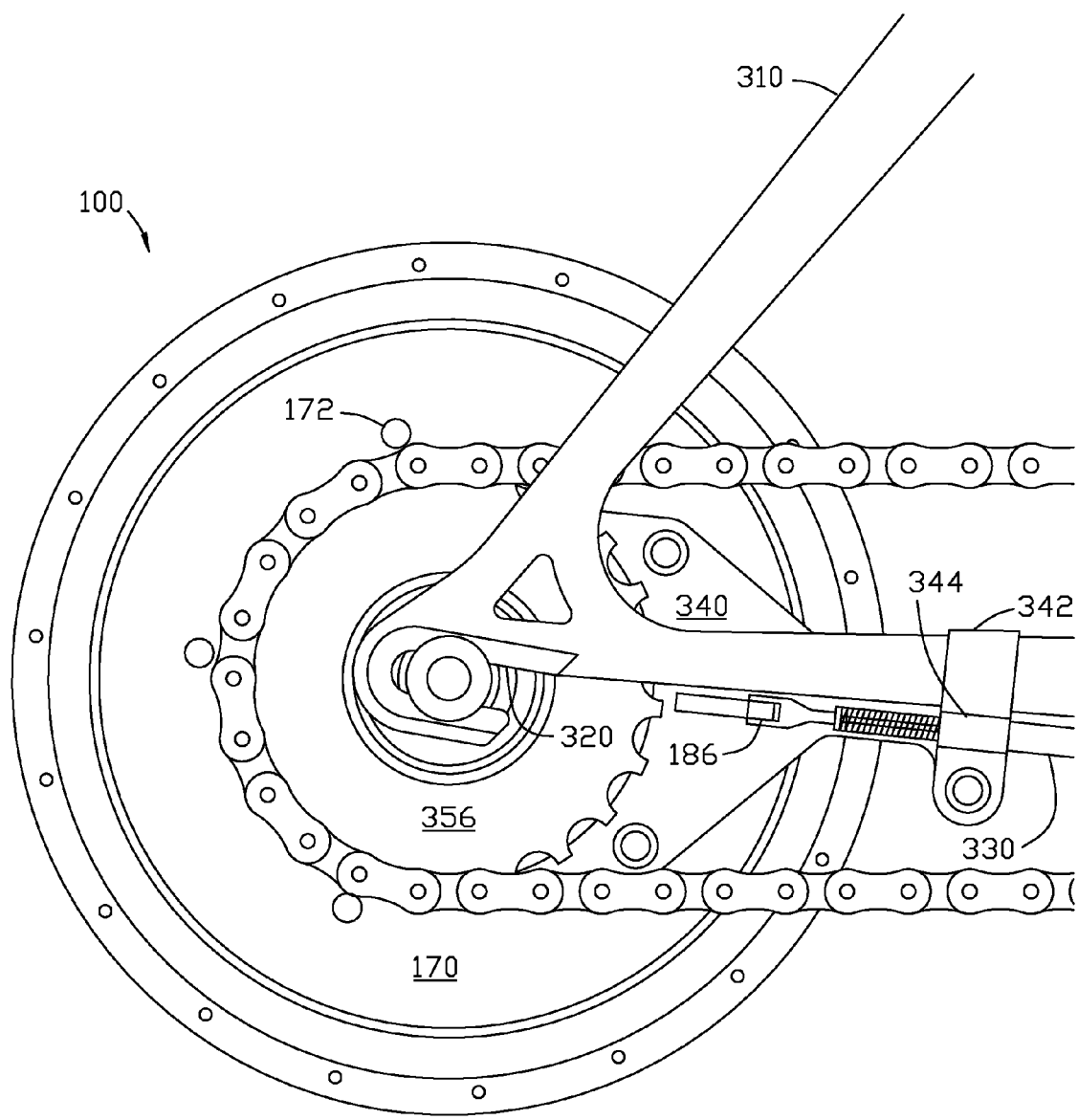
FIG. 16 is a right side view of the hub according to the invention installed in the rear wheel of a chain-drive bicycle.
Figure 17:
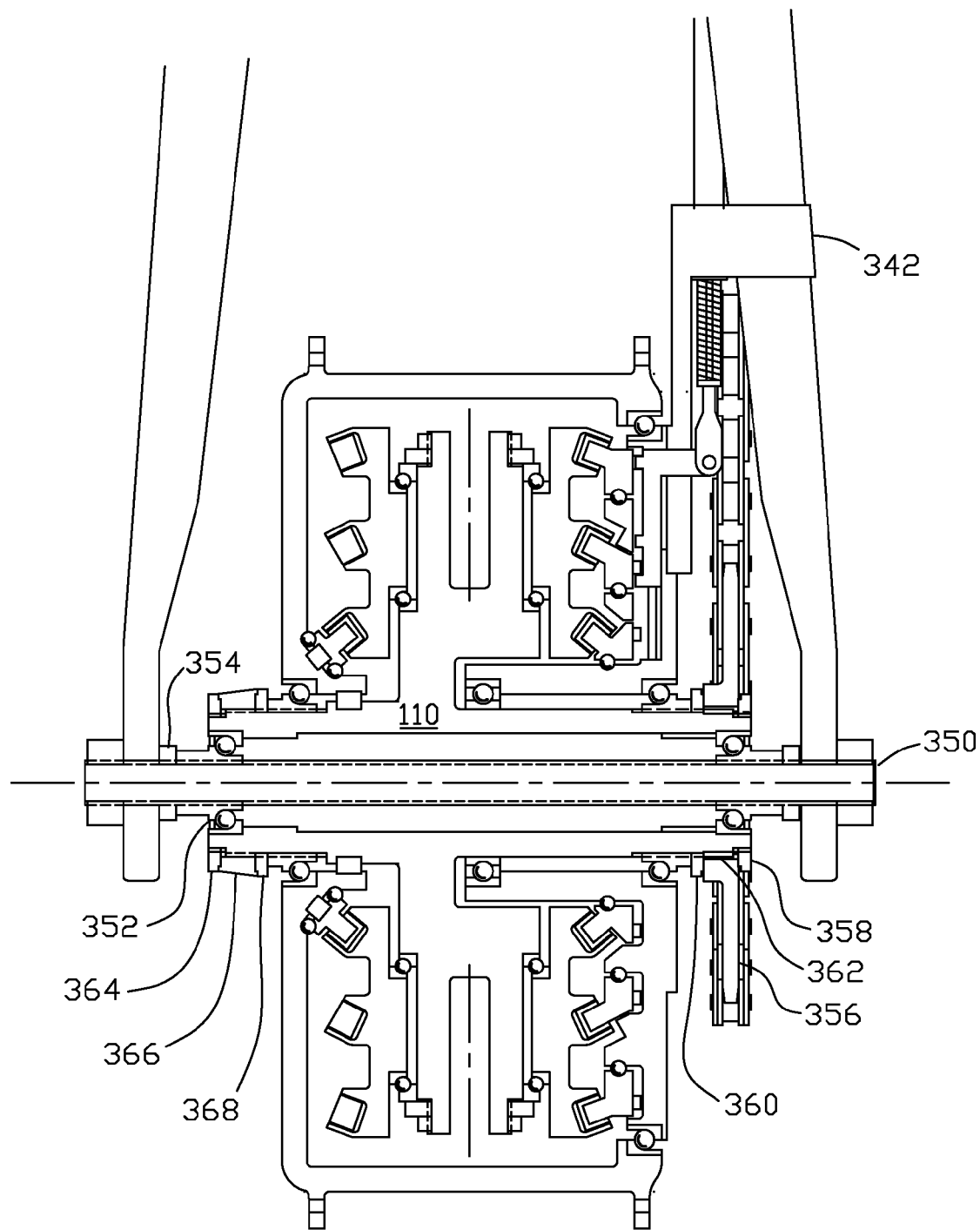
FIG. 17 is a corresponding cross-section of the installation of FIG. 16.

As seen in FIGS. 16 and 17, the hub (100) can be mounted conventionally for chain-drive on the rear stays (310) of a regular bicycle. The rear stays (310) preferably have horizontal drop-outs (320) to allow chain tensioning without a chain tensioner. As shown in FIG. 16, the hub is oriented so that the gear shift slider (186) faces forward to facilitate connection of a shifter cable (330) to the gear shift slider (186). A torque reaction lever (340) is bolted to the bevel ring gear holder (170) using two of the bolt holes (172) and is connected at its opposite end to the right rear stay of the bicycle using clip (342). The torque reaction lever (340) also holds the shifter cable stop (344). As shown in FIG. 17, the hollow shaft is fitted with a threaded axle (350) having cup and cone ball bearings (352) with locknuts (354), as is well-known in the art. A drive sprocket (356) is fitted on the right external end of the hollow shaft (110) and held in place by sprocket locknut (358). The sprocket locknut (358) also serves to lock a right bearing adjustment nut (360) in place. The drive sprocket (356) transmits drive to the hollow shaft (110) through spline (362). On the left end of the hollow shaft, a left locknut (364) holds a spacer (366) in place, and also serves as the locknut for left bearing adjustment nut (368).

Figure 18:
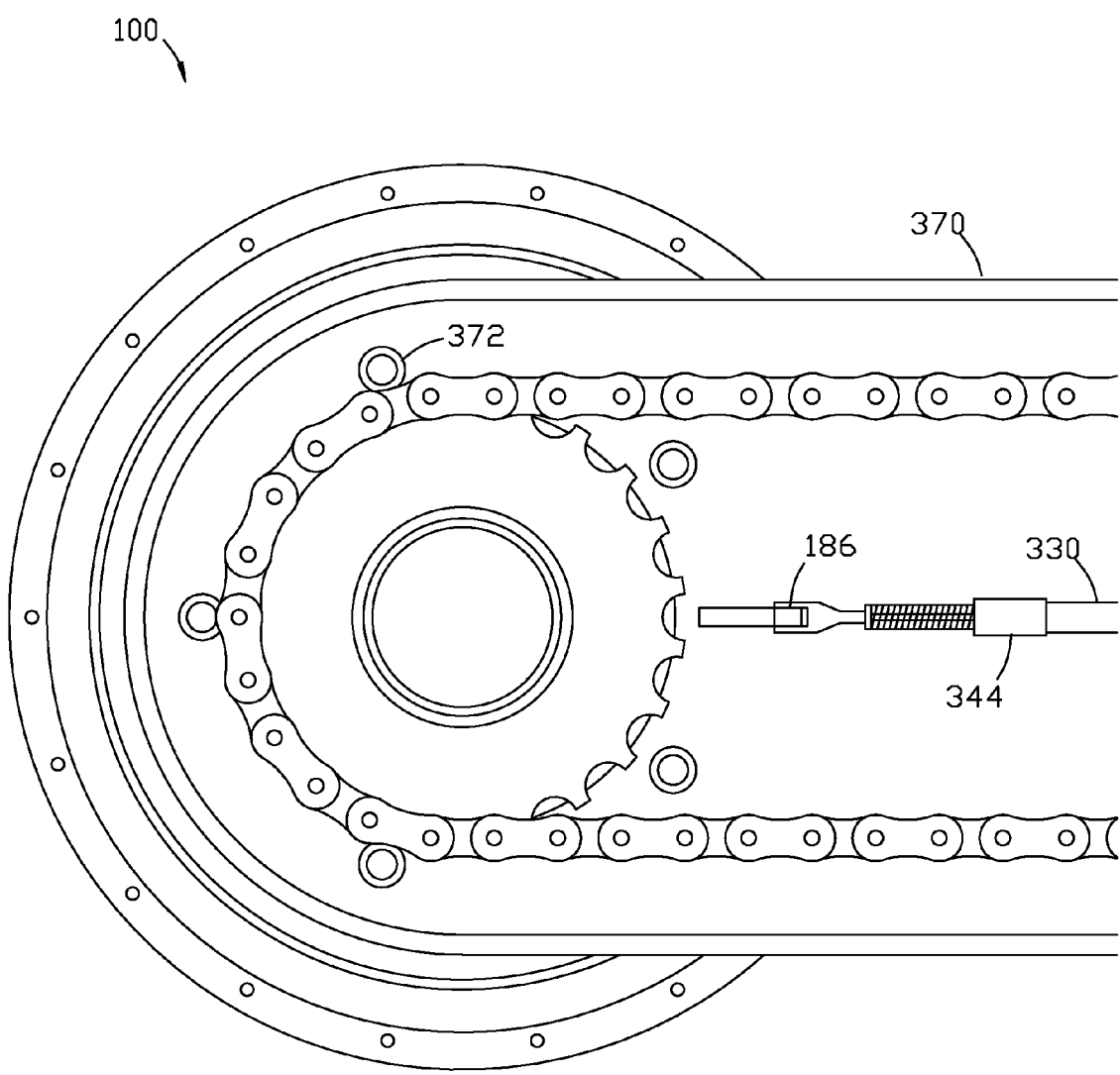
FIG. 18 is a right side view of the hub according to the invention installed in the rear wheel of a mono-blade chain-drive bicycle.
Figure 19:
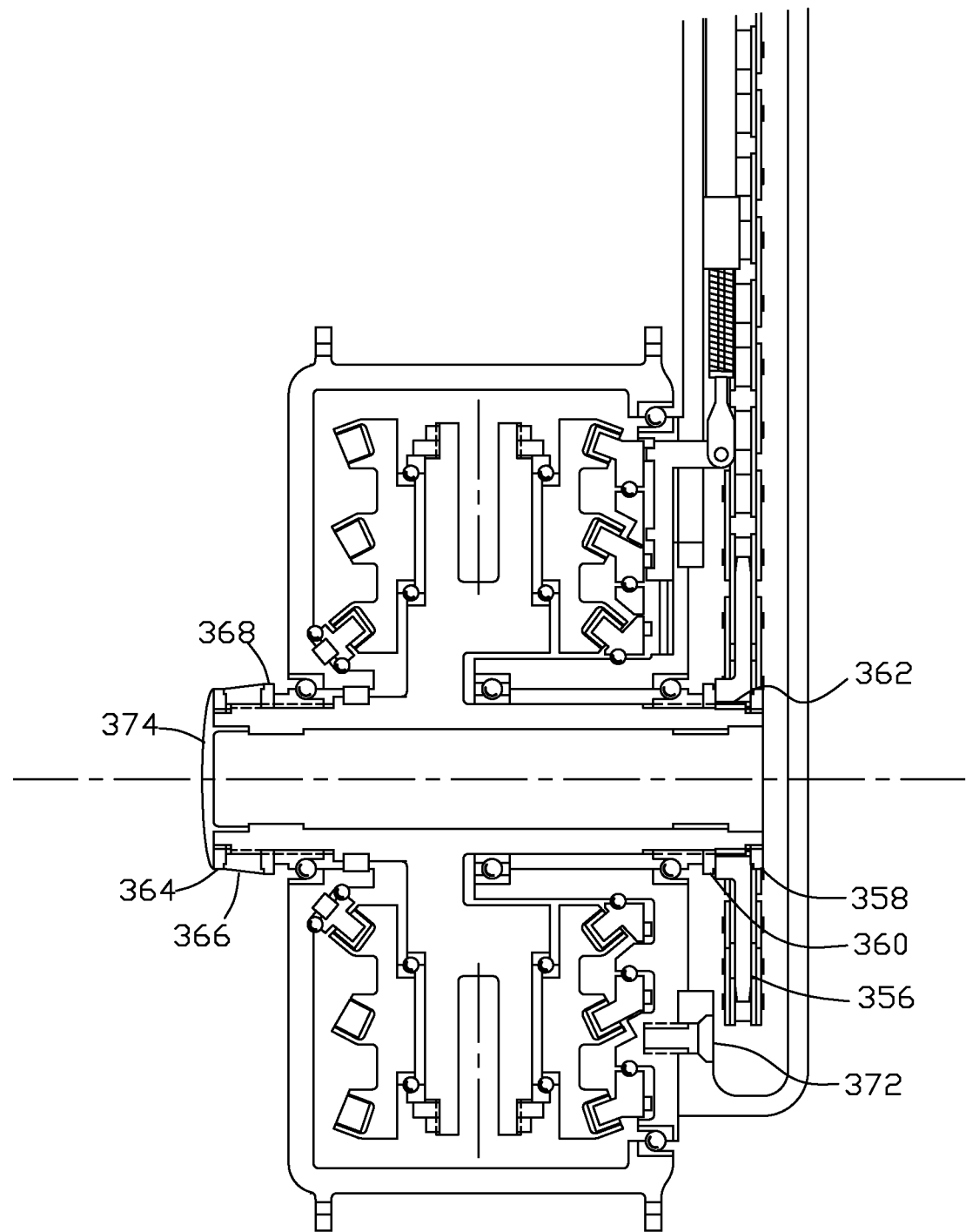
FIG. 19 is a corresponding cross-section of the installation of FIG. 18.

FIGS. 18 and 19 depicts the hub (100) of the invention still configured for rear-wheel chain-drive, but arranged for mono-blade mounting. The hub is mounted on a rear mono-blade stay (370) by bolts (372). The mono-blade stay is hollow in construction to serve as a chain case, thus protecting the chain from dirt and moisture. The hollow mono-blade stay (370) also completely encases the gear shift slider (186) and a rear portion of the gear shifter cable (330). For this, as shown in FIG. 18, the hub is oriented so that the gear shift slider faces forward. Torque reaction takes place directly through the mono-stay mounting, so no separate torque reaction lever is required. The shifter cable stop (344) is integrally formed with the mono-blade stay (370). As shown in FIG. 19, to be adapted to mono-blade chain-drive, the hollow shaft (110) is left open, except for a decorative hub cap (374) fitted in the left end. In a manner similar to conventional mounting, a drive sprocket (356) is fitted on the right external end of the hollow shaft (110) and held in place by locknut (358). This locknut also serves to lock bearing adjustment nut (360) in place. The drive sprocket (356) transmits drive to the hollow shaft through spline (362). On the left end of the hollow shaft, locknut (364) holds a spacer (366) in place, and also serves as the locknut for bearing adjustment nut (368).

Figure 20:
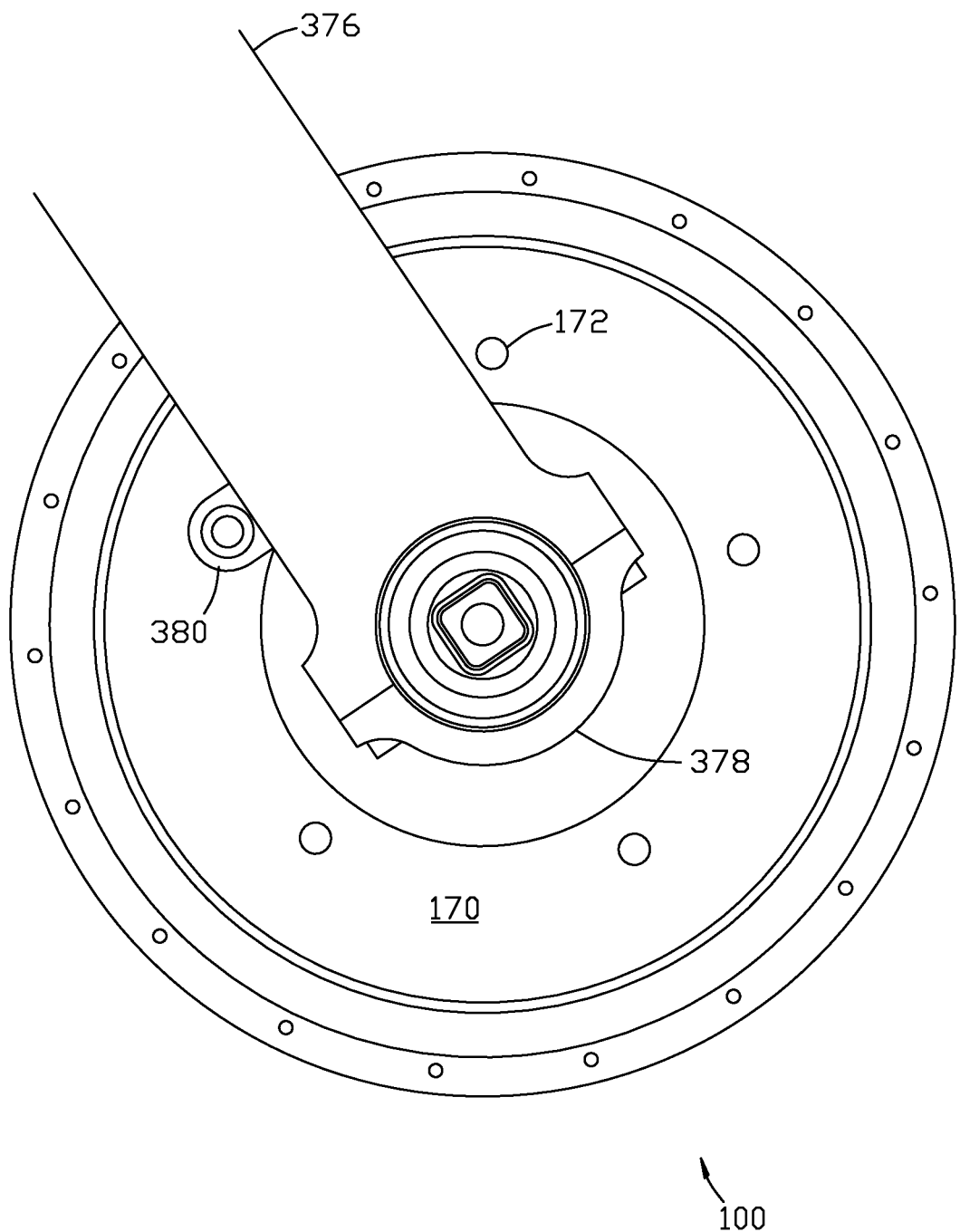
FIG. 20 is a right side view of the hub according to the invention installed in the front wheel of a direct-drive recumbent bicycle.
Figure 21:
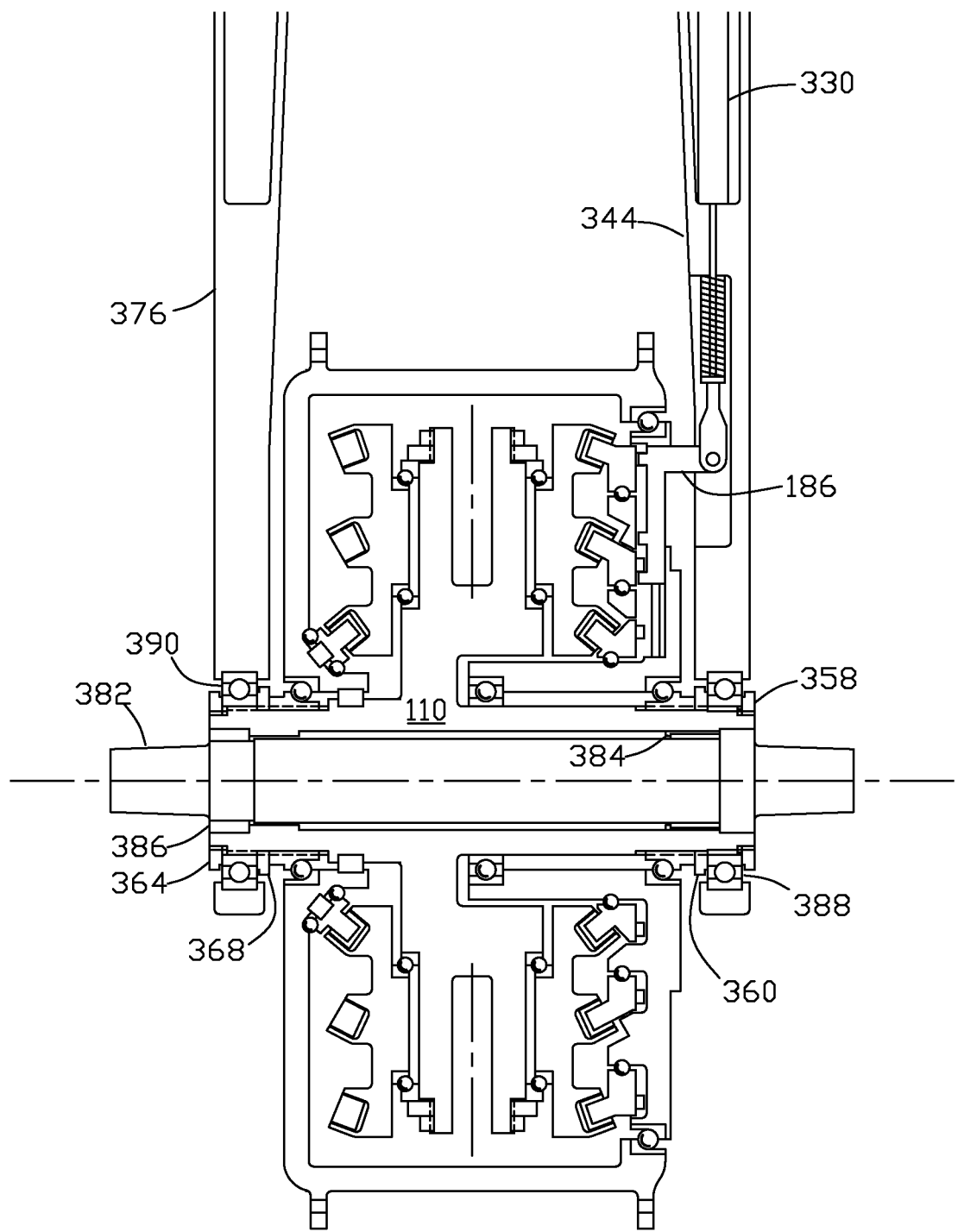
FIG. 21 is a corresponding cross-section of the installation of FIG. 20.

As seen in FIGS. 20 and 21, the hub (100) can be mounted for direct-drive on the front fork (376) of a direct-drive recumbent bicycle (FIG. 1). The fork (376) preferably has bearing caps (378) for easy removal of the wheel. As shown in FIG. 21, the hub (100) is oriented so that the gear shift slider (186) is aligned with the direction of the fork and faces the crown of the fork, so as to facilitate connection of the shifter cable (330) to the gear shift slider (186). A torque reaction tab (380—FIG. 20) is bolted to the bevel ring gear holder (170) using one of the bolt holes (172). As shown in FIG. 21, the shifter cable stop (344) is integral with the right blade of the fork (376). To be adapted to direct-drive, the hollow shaft (110) is fitted with a crank axle (382). The crank axle (382) engages an internal spline (384) in the bore of the hollow shaft (110), providing positive drive engagement. A crank axle locknut (386) is placed on the opposite end of the crank axle (382) and tightened to secure the crank axle (382) in place in the bore of the hollow shaft (110). A right mounting bearing (388) is fitted on the right external end of the hollow shaft (110) and held in place by locknut (358). The locknut (358) also serves to lock bearing adjustment nut (360) in place. On the left end of the hollow shaft, locknut (364) holds a similar left mounting bearing (390) in place, and also serves as the locknut for bearing adjustment nut (368). Pedal cranks are then secured to the crank axle (382) in a conventional manner.

Figure 4:
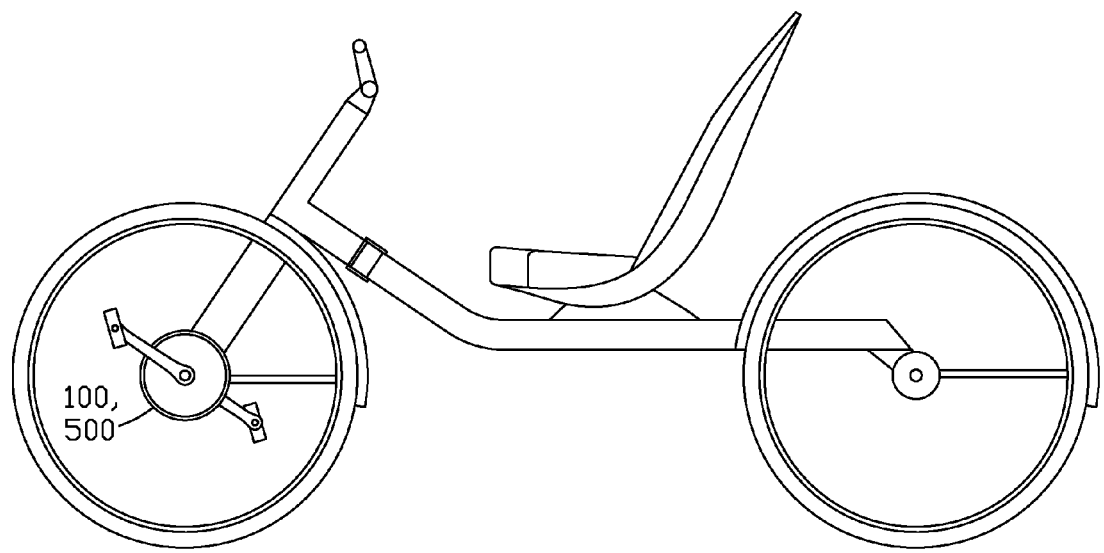
FIG. 4 is a left side view of the hub according to the invention installed in the front wheel of a mono-blade direct-drive recumbent bicycle.
Figure 5A:
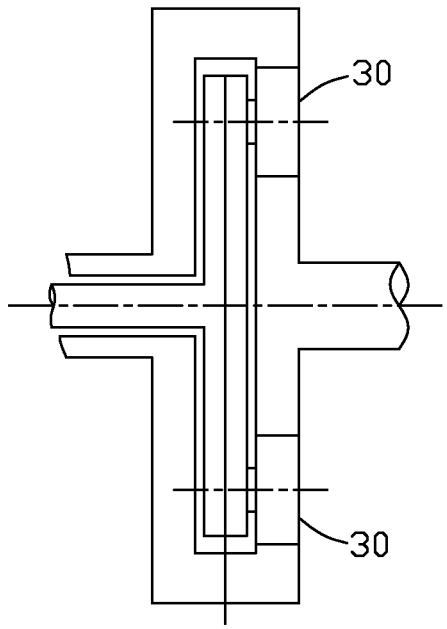
FIG. 5A-5D compares the cross-section of conventional planetary units to equivalent bevel planetary units.
Figure 5B:
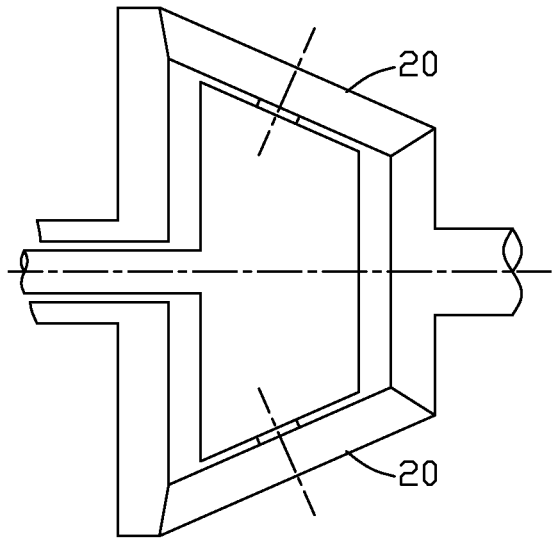
Figure 5C:
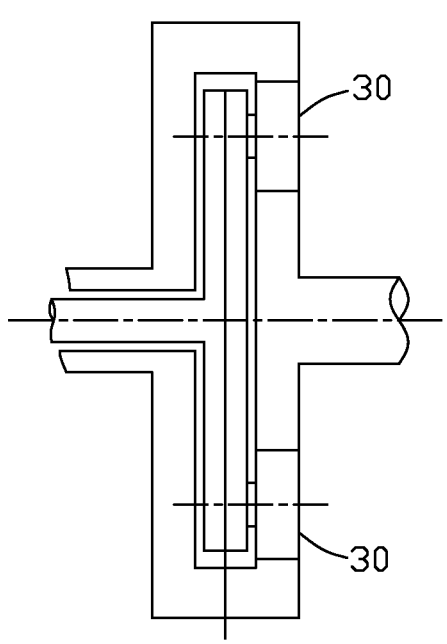
Figure 5D:
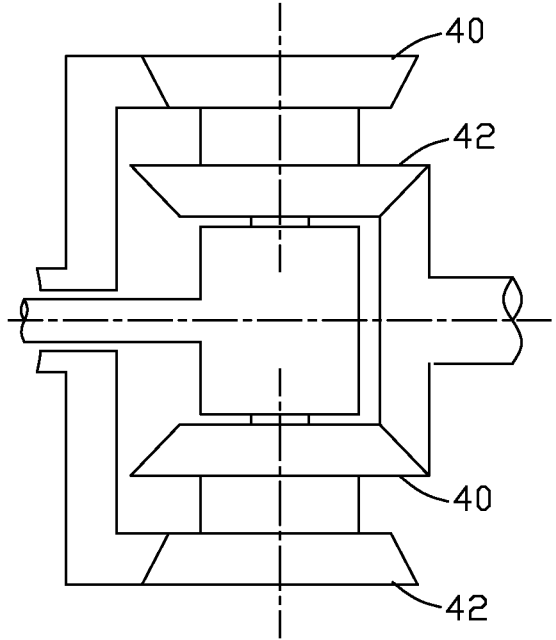
Figure 6:
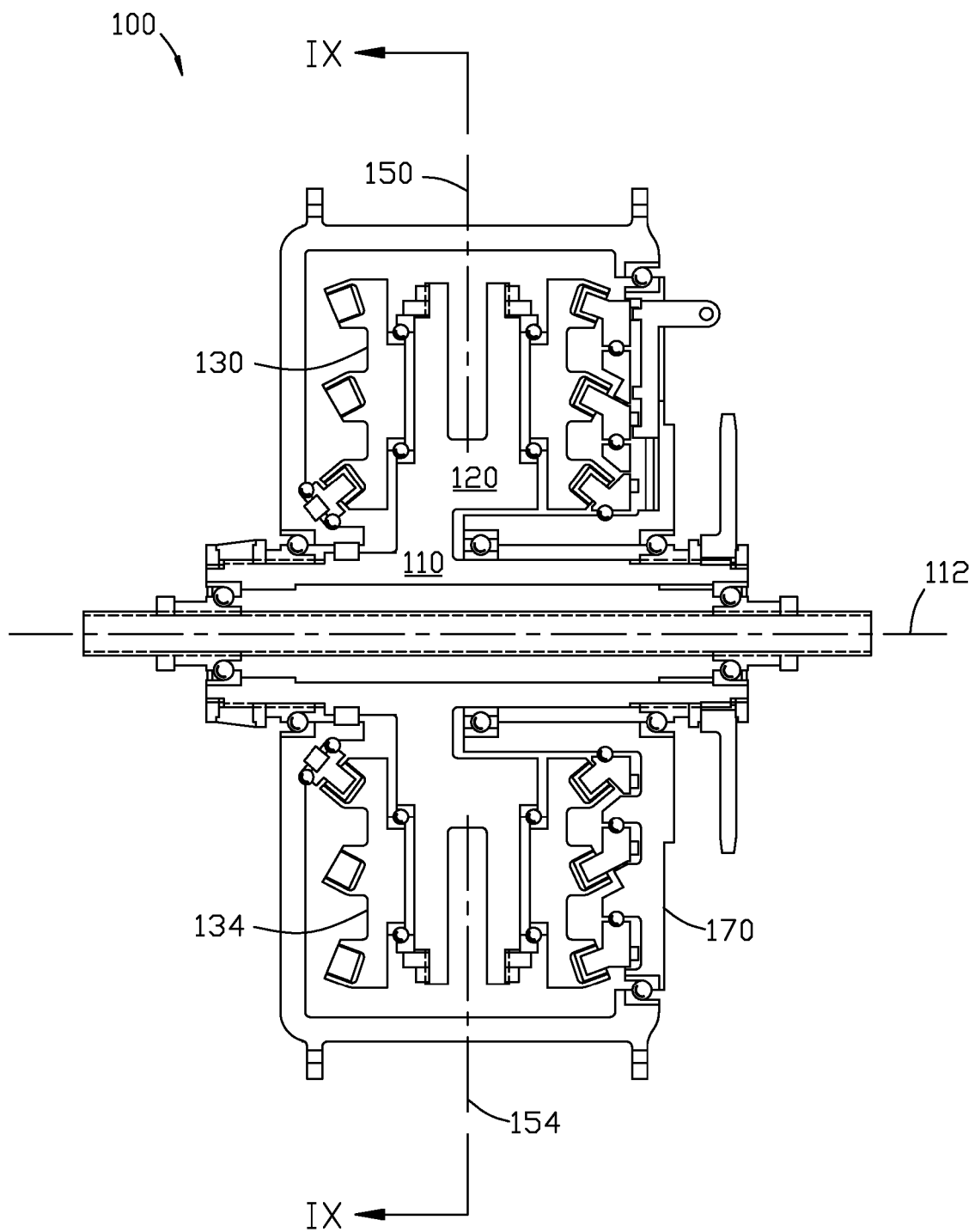
FIG. 6 is a cross-section of the hub according a first embodiment of the invention.
Figure 7:
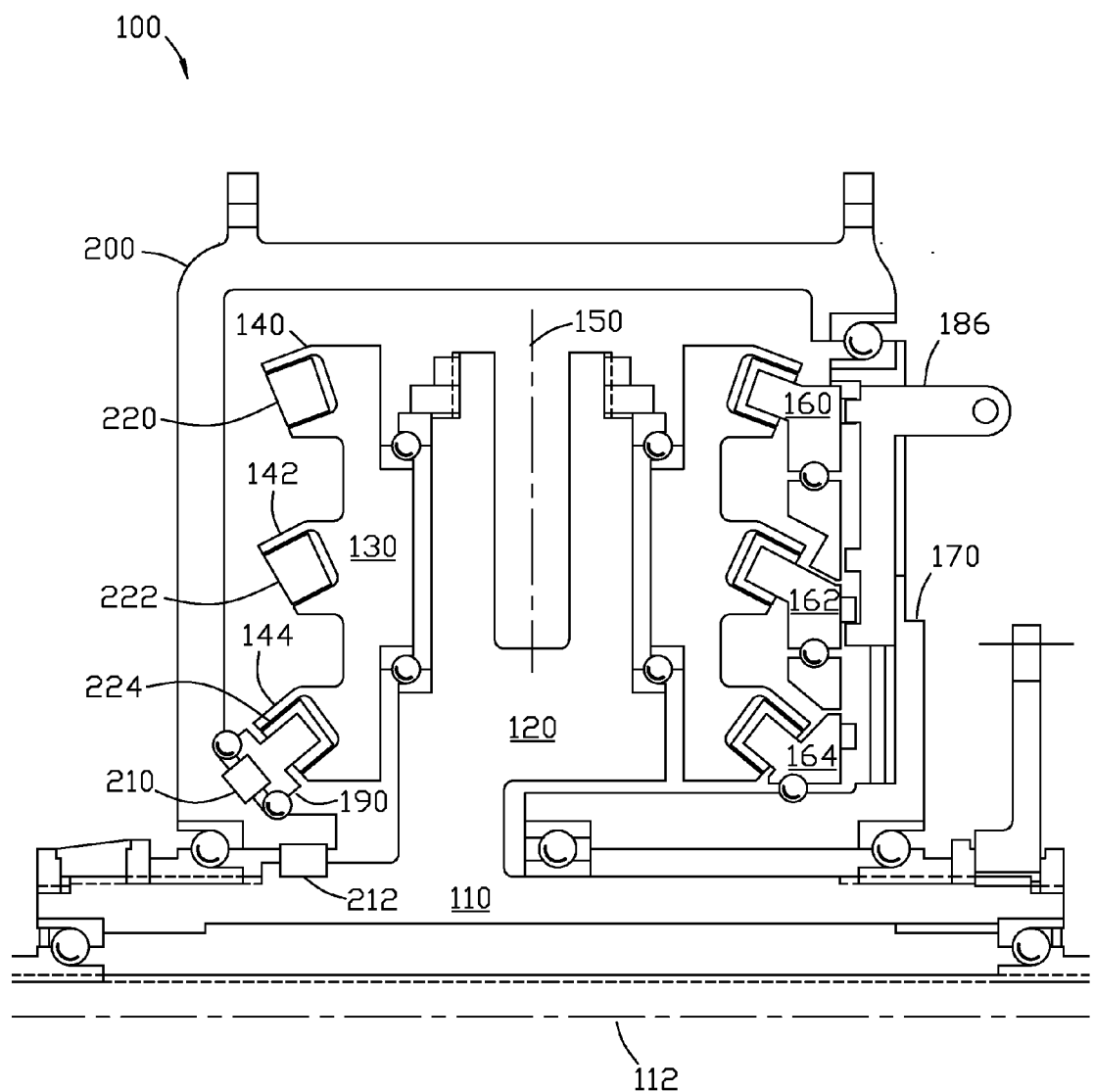
FIG. 7 is an enlarged view of a top section of FIG. 6 showing the planetary gear operation in more detail.
Figure 8:
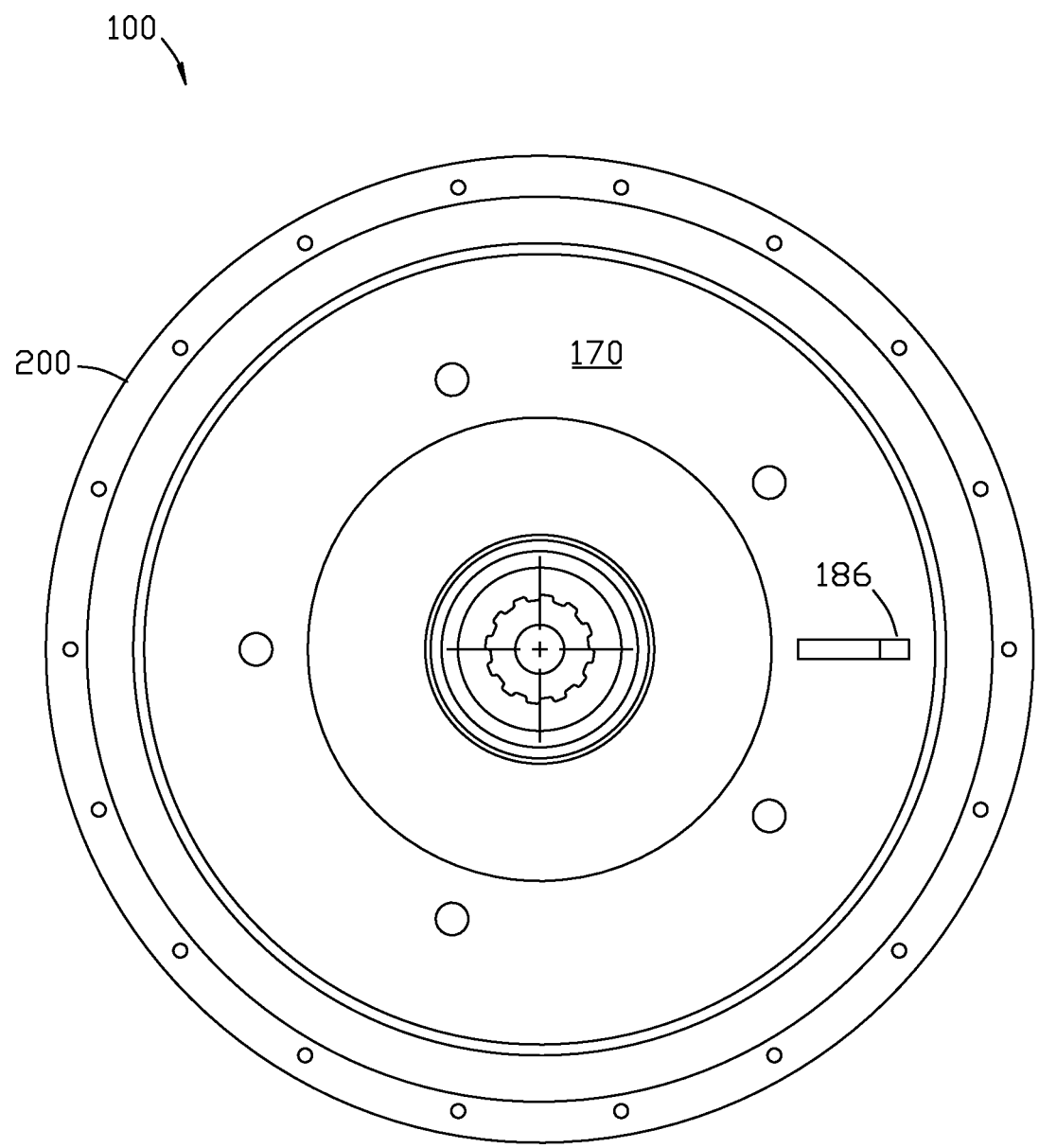
FIG. 8 is a right side view of the hub of FIG. 6.
Figure 9:
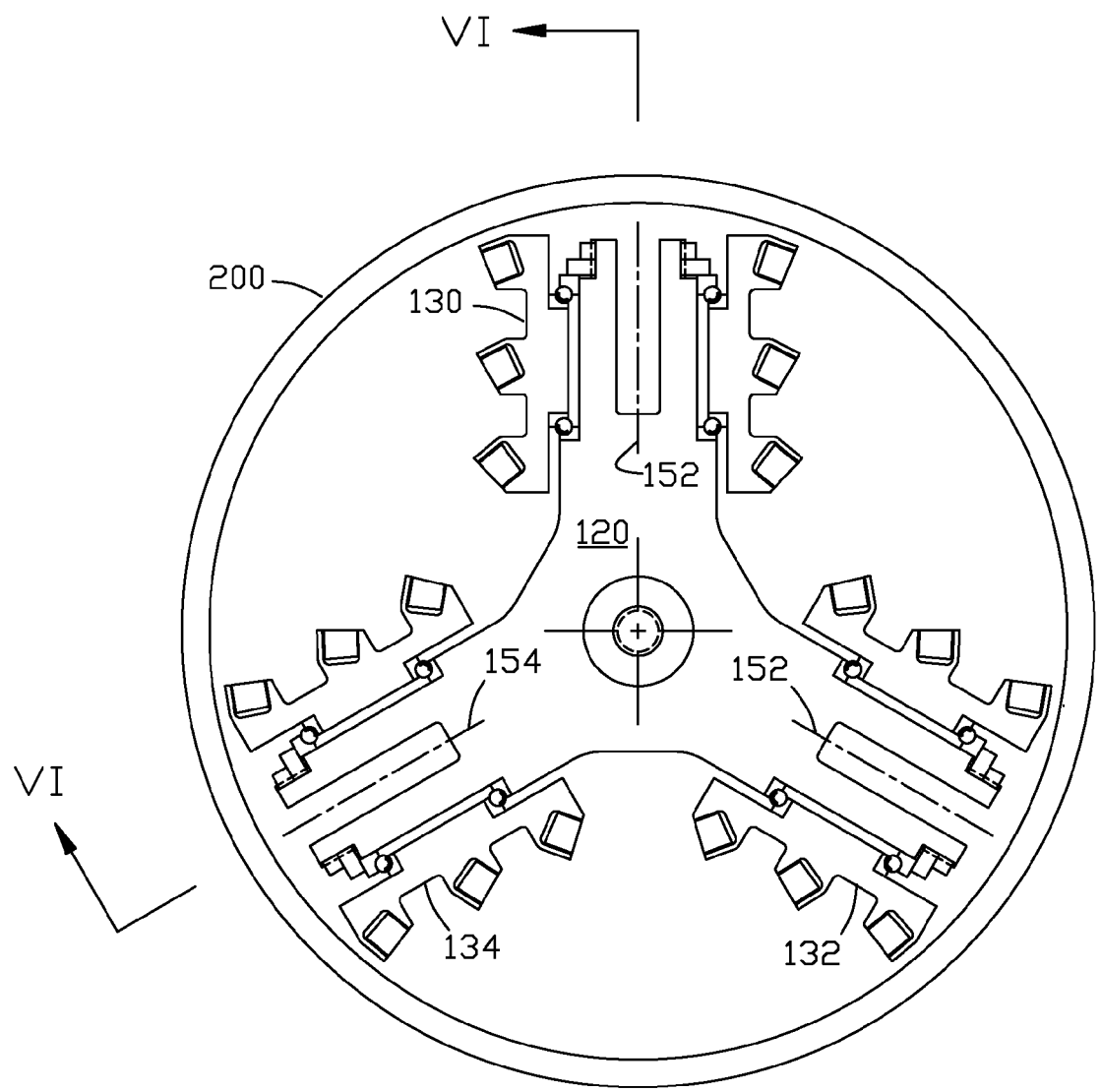
FIG. 9 is cross-section of the hub at line IX-IX of FIG. 6.
Figure 22:
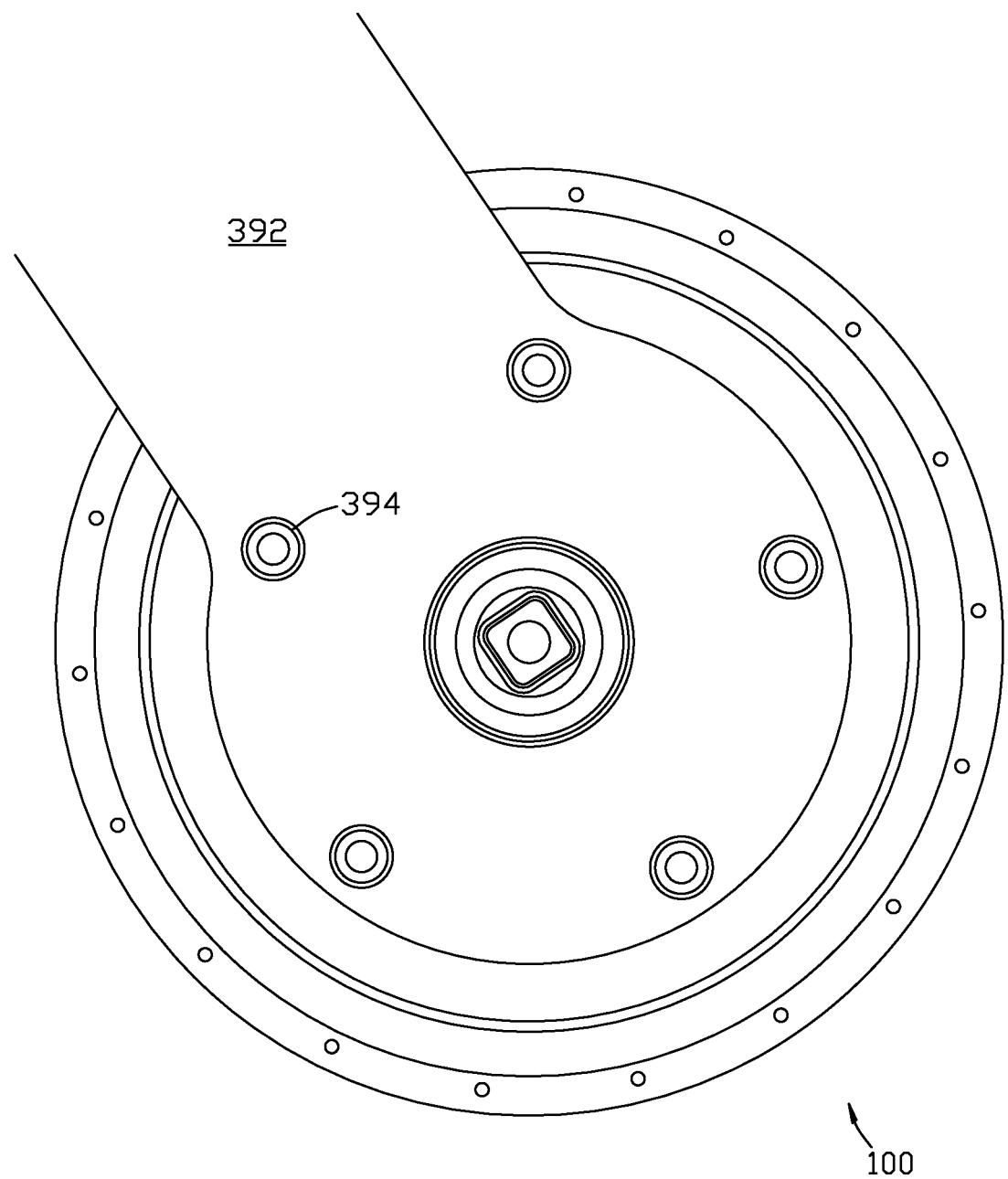
FIG. 22 is a right side view of the hub according to the invention installed in the front wheel of a mono-blade direct-drive recumbent bicycle.
Figure 23:
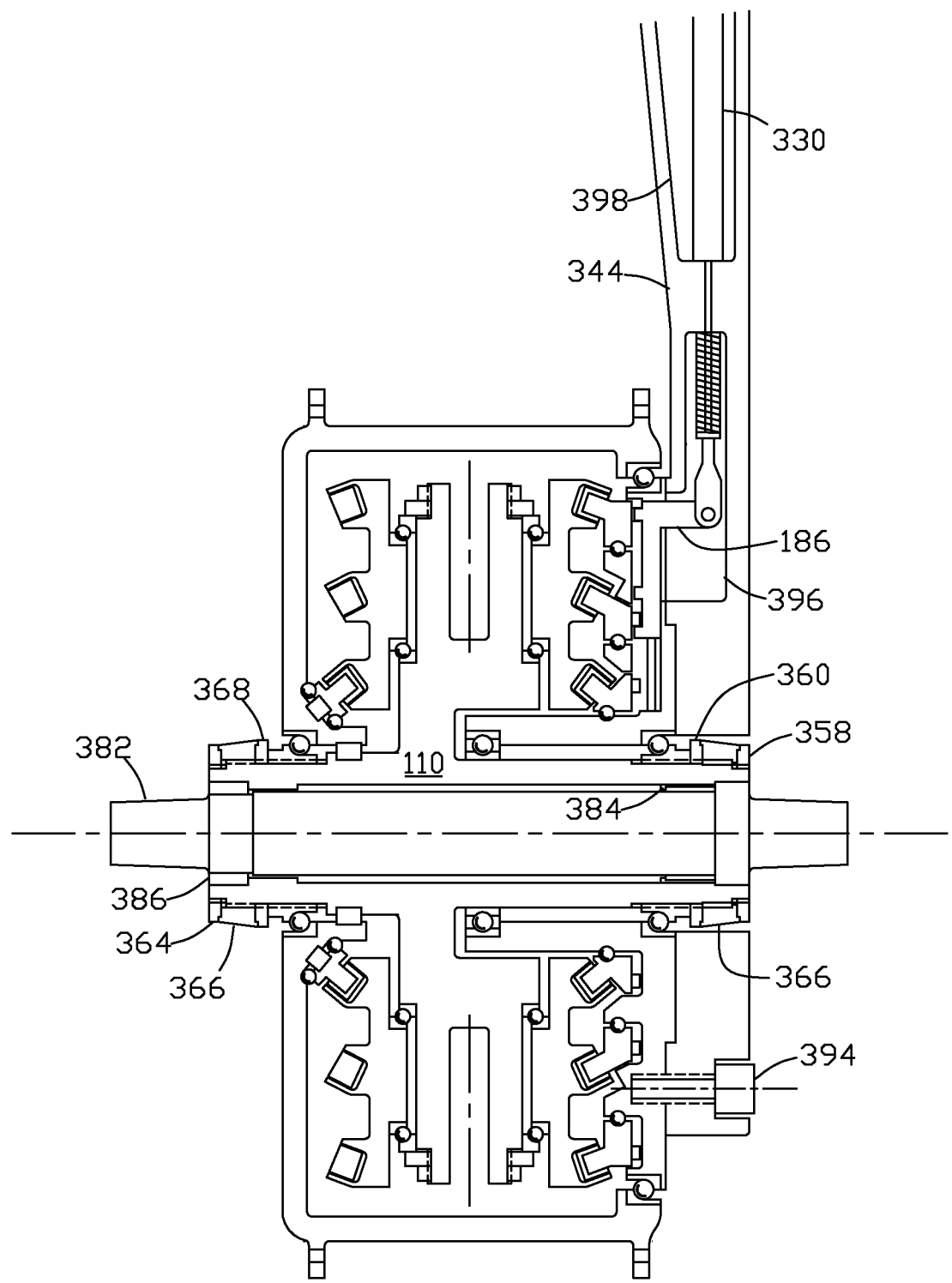
FIG. 23 is a corresponding cross-section of the installation of FIG. 22.
Figure 24:
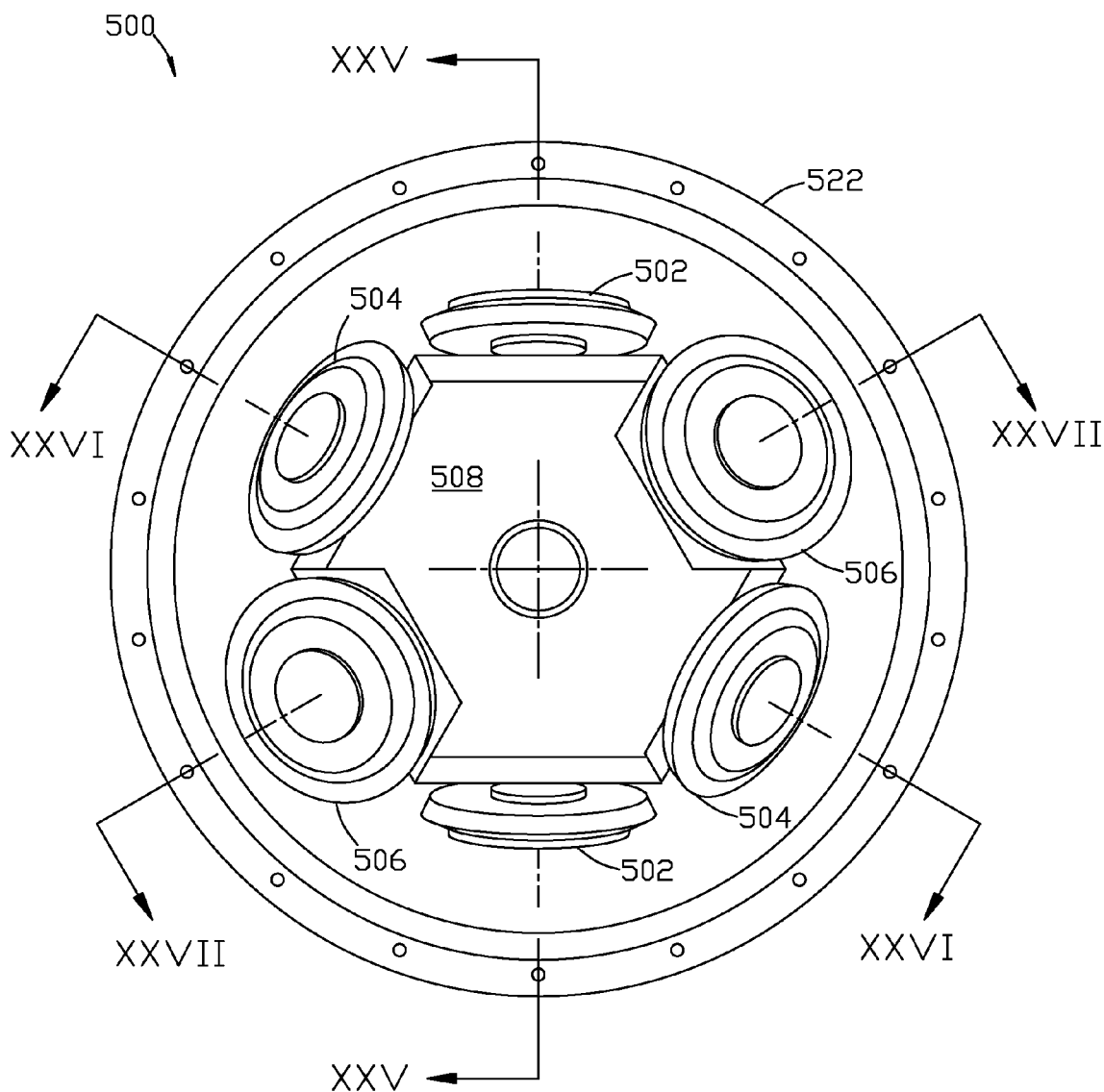
FIG. 24 is a right side view of the planet gear holder of the second embodiment of the invention, showing the arrangement of the bevel planet gears.

As seen in FIGS. 22 and 23, the hub (100) can be mounted for direct-drive on a mono-blade front fork (392) of a direct-drive recumbent bicycle (as shown in FIG. 4). The hub is mounted on the mono-blade front fork (392) by bolts (394). Due to the slot (396) and a hollow region (398), the mono-blade front fork (392) completely encases the gear shift slider (186) and upper portion of the gear shifter cable (330). To achieve this, as shown in FIG. 23, the hub (100) is oriented so that the gear shift slider (186) faces upward and is aligned with the direction of the mono-blade front fork (392). Torque reaction takes place directly through the mono-blade mounting, so no separate torque reaction lever is required. The shifter cable stop (344) is integrally formed with the mono-blade casing. To be adapted to mono-blade direct-drive, the hollow shaft (110) is fitted with a crank axle (382) in a manner similar to regular direct-drive mounting. The crank axle (382) engages the internal spline (384) in the bore of the hollow shaft (110) to providing positive drive engagement, and the crank axle locknut (386) is placed on the opposite end of the crank axle to secure the crank axle (382) in the hollow shaft (110). For mono-blade mounting, no mounting bearing are required, so two spacers (366) are fitted in their place. The locknuts (358, 364) lock each respective bearing adjustment nut (360, 368) in place. Pedal cranks are then secured to the crank axle (382) in a conventional manner.

FIGS. 24 to 27 illustrates a second embodiment (500) of the bicycle hub of the invention. In this second embodiment, bevel planet gear pairs (502, 504, 506) are mounted on a planet gear holder (508) at different angles, and each bevel planet gear pair (502, 504, 506) forms a direct gear train between a respective bevel ring gear (510, 512, 514) and an output bevel gear (515). In a manner similar to the first embodiment, a particular gear ratio is obtained by preventing the rotation of one of the bevel ring gears (510, 512, 514), and allowing the rotation of the other bevel ring gears. Typically, each ratio has an associated bevel planet gear pair (502, 504, 506), each having the same angle of inclination and spaced 180 degrees apart on the planet gear holder (508). Unlike the first embodiment, the output bevel gear (515) has three gear rings (516, 518, 520), each engaging one particular bevel planet gear pair (502, 504, 506), respectively. The three gear rings (516, 518, 520) are all fixed to the output bevel gear (515) and thus all move together and drive the hub shell (522) through a first freewheel (524), as with the first embodiment. Similarly, a second freewheel (526) drives the hub shell (522) when the hub (500) is in first gear.

The gear change mechanism and mode of operation of the second embodiment is similar to that of the first embodiment. In addition, the interchangeable spindle is identical to that of the first embodiment. Although the second embodiment (500) is shown mounted for mono-blade direct-drive, the hub can be mounted for any the other three configurations, in a manner identical to the first embodiment (100).

Figure 25:
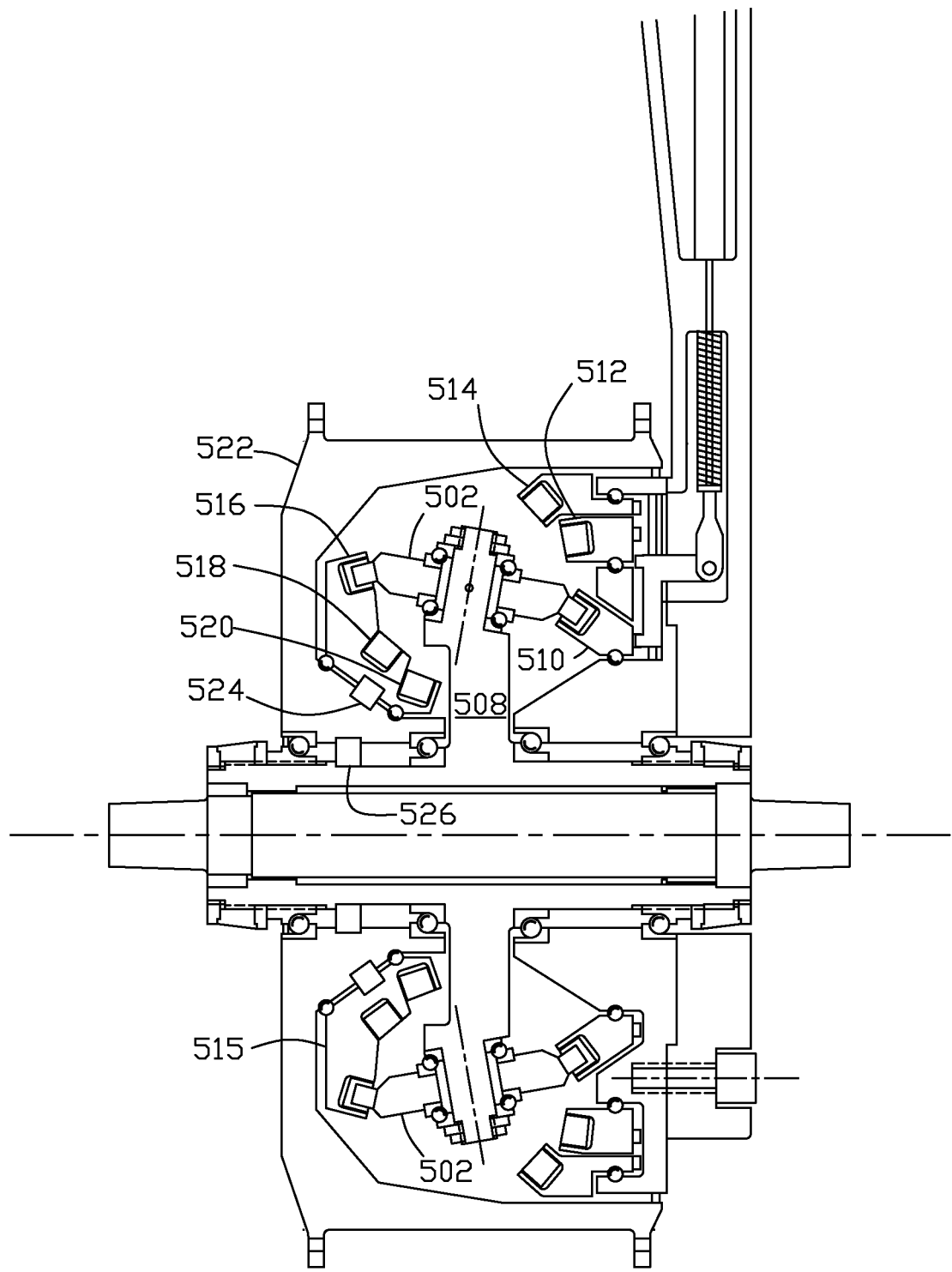
FIG. 25 is a cross-section, at XXV-XXV of FIG. 24, of the first planet gear group according the second embodiment of the invention.
Figure 26:
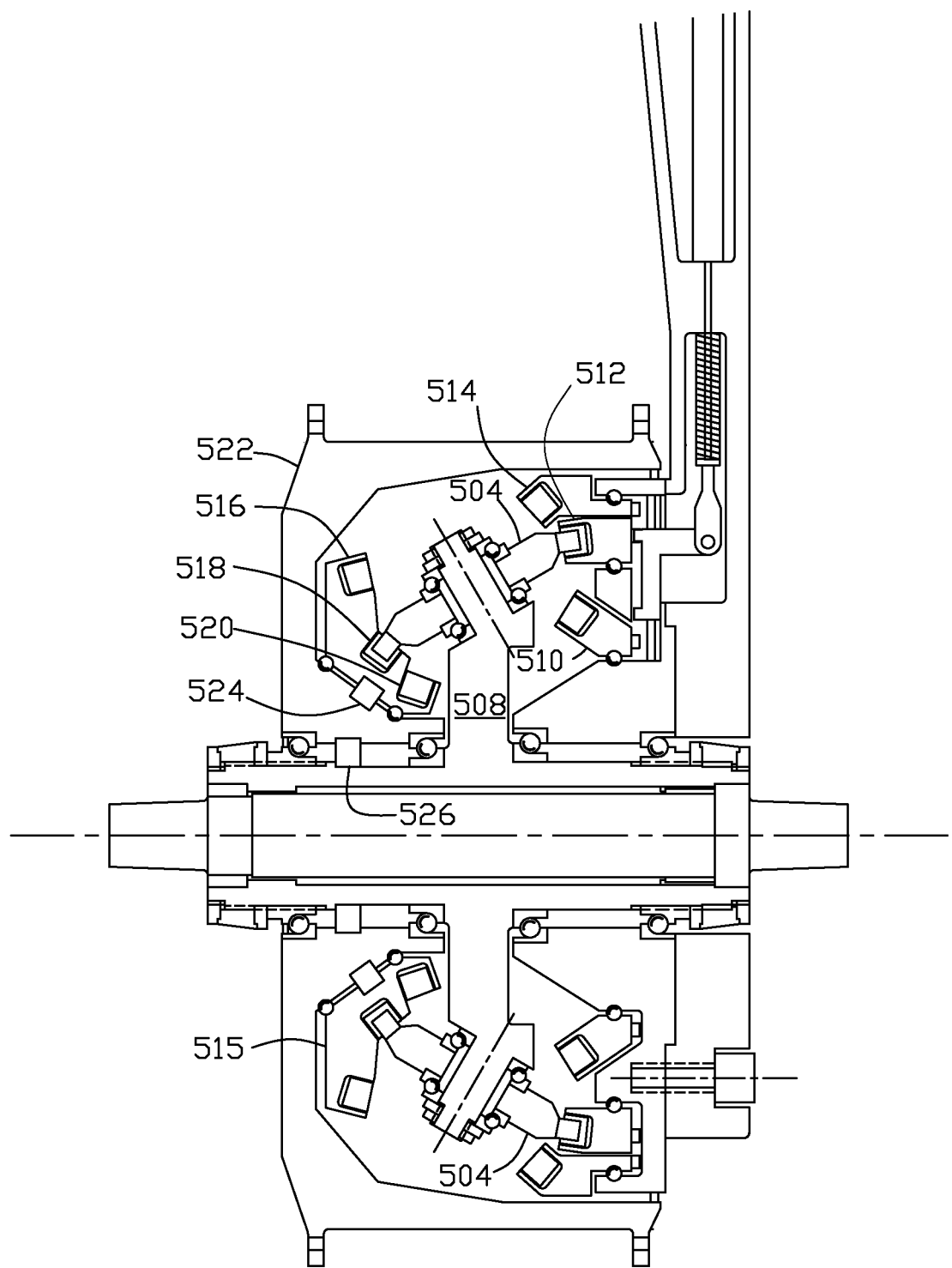
FIG. 26 is a cross-section, at XXVI-XXVI of FIG. 24, of the second planet gear group according the second embodiment of the invention.
Figure 27:
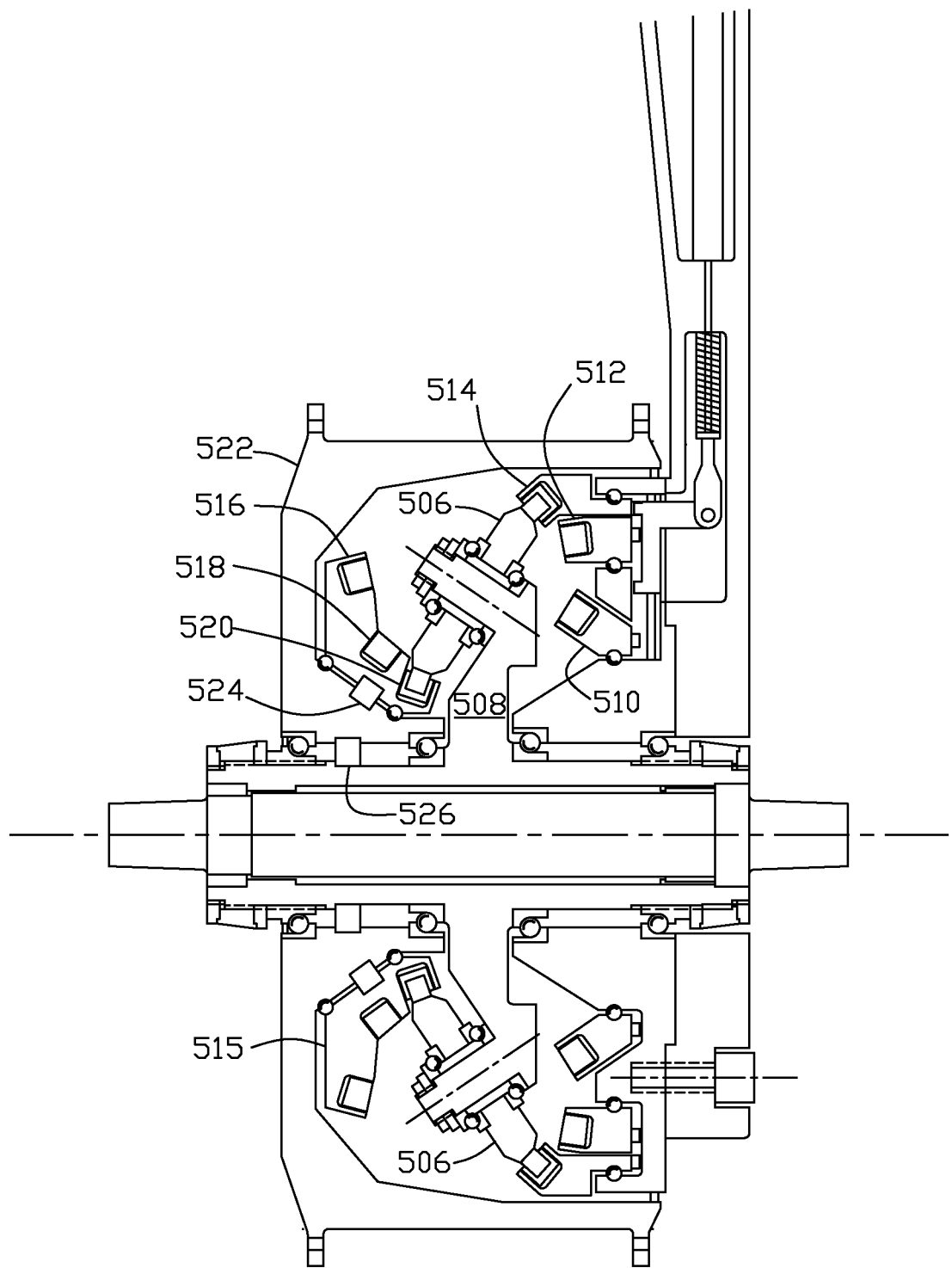
FIG. 27 is a cross-section, at XXVII-XXVII of FIG. 24, of the third planet gear group according the second embodiment of the invention.

FIGS. 25 to 27 show the roller teeth mounted to the bevel ring gears (510, 512, 514) and the three gear rings (516, 518, 512) of the output bevel gear (515), rather than mounted to the bevel planet gear pairs (502, 504, 506). This serves to illustrate that the roller teeth may be mounted on the ring and output gears rather than on the planet gears. This is true of both embodiments (100, 500).

FIGS. 25 to 27 also illustrate an alternate bearing mounting for the hub shell (522). The hub shell is mounted on two bearings on the hollow shaft, rather than one bearing on the hollow shaft and the other on the ring gear holder. This eliminates the large bearing between the ring gear holder and the hub shell. Although this bearing arrangement can also be used with the hub shell (200) of the first embodiment (100), the second embodiment (500) provides more room in the inside corners of the hub shell for the cantilever strength required.

Compared to the first embodiment (100), the second embodiment (500) has the advantage of giving a more direct load path through the bevel planet gears resulting in less structural material and thus lower weight. However, a lower number of gear ratios is available than with the first embodiment because of the limited circumferential space around the planet gear holder (see FIG. 24). Also the load is typically transferred through two bevel planet gears for each ratio, rather than three, reducing the allowable torque transmitted.

Several variations can be made within the scope of the invention as follows.

The number of gears can be less than or more than four, depending on the number of bevel planet gears and bevel ring gears. However, having more than four speeds is better suited to the first embodiment than the second embodiment, due to the limited circumferential space available around the planet gear holder in the second embodiment. In addition, although the first embodiment shows three groups (130, 132, 134) of bevel planet gears, there can be more groups, or less groups, if desired.

The bearings for the hub shell, hollow shaft, and bevel planet gears can be cartridge bearings rather than the cup and cone bearing shown, or they can be roller bearings. Furthermore, since the bevel ring gears are only under load when stationary, the bearings for the bevel ring gears need not be the ball bearings as illustrated, but can be plain bearings or bushings of bronze, or other well known bushing materials.

The hub can also be installed on other types of bicycles than the four illustrated. For example the hub can be installed for chain-drive in the rear wheel of a small-wheel bicycle, folding bicycle, or tandem bicycle. The hub also can be mounted for direct-drive in the rear wheel of an upright bicycle or upright tandem bicycle, or in the rear wheel of a prone recumbent bicycle. In addition, the hub can be mounted for direct-drive in the front wheel of a recumbent tricycle having two rear wheels (delta tricycle). The hub can also be installed in the front and rear wheels of a tandem direct-drive recumbent bicycle, where the rear rider (stoker) faces backwards and pedals backwards to drive the rear wheel forwards. In a similar way, the hub can be installed in the rear wheel of a tandem recumbent tricycle with two front wheels (tadpole tricycle), where the stoker faces backward. The hub can also be installed in the front wheel of a handcycle. In all cases, the hub could be mounted for conventional double-blade mounting, or for mono-blade mounting.

REFERENCES

Burrows, M., (2000). *Bicycle Design,* York: Company of Cyclists, pp. 137-144.

Garnet, J. M., (2009). "Ergonomics of Direct-Drive Recumbent Bicycles", *Human Power,* No. 58, pp. 17-29. Also available from the Human Power e-journal at: http://www.hupi.org/HPeJ/0017/GarnetDirectDriveRecumbents.pdf Wilson, D. G. (2004). *Bicycling Science,* 3rd ed., Cambridge, Mass.: The MIT Press, pp. 342-345.

The invention claimed is:

1. A bicycle hub transmission comprising:
a planet gear holder fixed to a drive shaft, the drive shaft and the planet gear holder rotatable about a hub axis;
a plurality of bevel planet gears rotatably mounted on the planet gear holder about axes which intersect the hub axis;
a plurality of bevel ring gears rotatably mounted about the hub axis, each of said plurality of bevel ring gears meshing with at least one of said plurality of bevel planet gears;
at least one bevel output gear; each of said at least one bevel output gear meshing with at least one of said plurality of bevel planet gears;
a hub outer shell rotatably mounted about the hub axis;
a first freewheel configured to drive the hub outer shell in one direction by rotation of said at least one output bevel gear; and a second freewheel configured to drive the hub outer shell in said one direction by rotation of the drive shaft;
whereby a 1:1 gear ratio is obtained between the drive shaft and the hub outer shell by allowing free rotation of all of said plurality of bevel ring gears; and whereby ratios higher than 1:1 are obtained by holding any one of said plurality of bevel ring gears stationary;
wherein said bicycle hub transmission further includes a friction reducing tooth system selected from the group consisting of: a) a plurality of roller teeth fitted to the plurality of bevel planet gears, and b) a plurality of roller teeth fitted to the plurality of bevel ring gears and said at least one bevel output gear.

2. The bicycle hub transmission of claim 1, wherein each one of said plurality of roller teeth comprises a roller element having a frustoconical external surface having an imaginary apex coincident with the hub axis; and wherein the roller element has a roller internal bore; a mounting pin passing through the roller internal bore; the mounting pin being attached to mounting flanges at each respective end of the mounting pin.

3. The bicycle hub transmission of claim 1 wherein the hub outer shell is rotatably mounted by a first hub shell bearing on the drive shaft, and by a second hub shell bearing on a bevel ring gear holder.

4. The bicycle hub transmission of claim 1 wherein the hub outer shell is rotatably mounted by a first hub shell bearing on the drive shaft, and by a second hub shell bearing also on the drive shaft.

5. The bicycle hub transmission of claim 1 wherein any one of said plurality of bevel ring gears is held stationary by a gear shift slider; said gear shift slider mounted for sliding on a bevel ring gear holder; said gear shift slider having a plurality of clutch pawls on a surface facing an inside of the hub, and a connecting member for connection to a shifter cable on an opposite outward facing surface of the gear shift slider; whereby indexed movement of the gear shift slider by the shifter cable causes engagement between successive clutch pawls and protrusions on a reverse side of successive bevel ring gears, thereby preventing the rotation of each successive bevel ring gear, in order to change gear ratio.

6. The bicycle hub transmission of claim 1 wherein the drive shaft is hollow, having an internal bore; and wherein said plurality of bevel ring gears are rotatably mounted on an inward facing side of a bevel ring gear holder, said bevel ring gear holder having a hub mounting surface on an opposite, outward facing side.

7. The bicycle hub transmission of claim 6, further comprising an axle for attachment to a bicycle, said axle rotatably mounted in the internal bore of the drive shaft; and a drive sprocket mounted on the drive shaft for driving the drive shaft, whereby the bicycle hub transmission can be driven by chain-drive.

8. The bicycle hub transmission of claim 6, further comprising a drive sprocket mounted on the drive shaft for driving the drive shaft, whereby the bicycle hub transmission can be driven by chain-drive; and wherein the bicycle hub transmission is attached at the hub mounting surface to a mono-blade of a bicycle.

9. The bicycle hub transmission of claim 6, further comprising two bearings mounted on the drive shaft for rotational mounting of the drive shaft to a bicycle; and a crank axle fixed in the internal bore of the drive shaft for driving the drive shaft, whereby the bicycle hub transmission can be directly driven by pedal cranks.

10. The bicycle hub transmission of claim 6, further comprising a crank axle fixed in the internal bore of the drive shaft for driving the drive shaft, whereby the bicycle hub transmission can be directly driven by pedal cranks; and wherein the bicycle hub transmission is attached at the hub mounting surface to a mono-blade of a bicycle.

\* \* \* \* \*